US012556805B2

(12) United States Patent
Lee et al.

(10) Patent No.: US 12,556,805 B2
(45) Date of Patent: Feb. 17, 2026

(54) ELECTRONIC DEVICE AND OPERATION METHOD OF ELECTRONIC DEVICE

(71) Applicant: Samsung Electronics Co., Ltd., Suwon-si (KR)

(72) Inventors: Jihyun Lee, Suwon-si (KR); Jisu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 18/514,108

(22) Filed: Nov. 20, 2023

(65) Prior Publication Data
US 2024/0089584 A1 Mar. 14, 2024

Related U.S. Application Data

(63) Continuation of application No. PCT/KR2022/007211, filed on May 20, 2022.

(30) Foreign Application Priority Data

May 20, 2021 (KR) .................. 10-2021-0064962

(51) Int. Cl.
H04N 23/63 (2023.01)
G06F 3/04855 (2022.01)
H04N 23/667 (2023.01)

(52) U.S. Cl.
CPC ....... H04N 23/632 (2023.01); G06F 3/04855 (2013.01); H04N 23/633 (2023.01); H04N 23/667 (2023.01)

(58) Field of Classification Search
CPC .. H04N 23/631; H04N 23/632; H04N 23/633; H04N 23/667; H04N 21/8549; G06F 3/0485; G06F 3/04855
See application file for complete search history.

(56) References Cited

U.S. PATENT DOCUMENTS 8,621,356 B1 12/2013 Cho
8,705,943 B2 4/2014 Cho
(Continued)

FOREIGN PATENT DOCUMENTS

JP 2014127987 A 7/2014
KR 20100028344 A 3/2010
(Continued)

OTHER PUBLICATIONS

Extended European Search Report dated Aug. 13, 2024 issued in European Patent Application No. 22805026.6.
(Continued)

Primary Examiner — Daniel M Pasiewicz
(74) Attorney, Agent, or Firm — Nixon & Vanderhye, P.C.

(57) ABSTRACT

Disclosed is an electronic device comprising: a camera, a display, at least one processor, and memory, wherein the memory can store instructions that, when executed by one or more of the at least one processor, cause the electronic device to: display a timeline of first content in a first area displayed via the display; display, in a second area displayed via the display, a preview screen of the first content on the timeline, wherein the first content corresponds to a first indicator indicating a position on the timeline displayed in the first area; display second content received via the camera in the second area based on an input while maintaining the display in the first area; and record the second content, displayed in the second area, based on an input on a first icon displayed via the display, wherein the second content is recorded starting from a portion corresponding to the first indicator.

16 Claims, 21 Drawing Sheets

(56) References Cited

U.S. PATENT DOCUMENTS

| | | |
|---|---|---|
| 9,049,363 B2 | 6/2015 | Choi et al. |
| 9,256,284 B2 | 2/2016 | Hanaya et al. |
| 9,401,177 B2 | 7/2016 | Cho |
| 9,792,954 B2 | 10/2017 | Hanaya et al. |
| 9,953,680 B2 | 4/2018 | Kim et al. |
| 10,192,583 B2 | 1/2019 | Chee et al. |
| 11,169,680 B2 | 11/2021 | Park et al. |
| 2009/0129741 A1 | 5/2009 | Kim |
| 2010/0053342 A1 | 3/2010 | Hwang et al. |
| 2012/0308209 A1 | 12/2012 | Zaletel |
| 2015/0194186 A1 | 7/2015 | Lee et al. |
| 2015/0220249 A1 | 8/2015 | Snibbe et al. |
| 2016/0054873 A1 | 2/2016 | Snibbe et al. |
| 2016/0055884 A1 | 2/2016 | Zaletel |
| 2016/0300594 A1 | 10/2016 | Allen et al. |
| 2017/0032820 A1 | 2/2017 | Davis, III et al. |
| 2017/0068380 A1 | 3/2017 | Hong et al. |
| 2017/0186464 A1 | 6/2017 | Davis, III et al. |
| 2018/0068689 A1 | 3/2018 | Davis, III et al. |
| 2018/0330755 A1 | 11/2018 | Davis, III et al. |
| 2019/0355337 A1 | 11/2019 | Steinwedel et al. |
| 2022/0028362 A1 | 1/2022 | Steinwedel et al. |
| 2022/0057929 A1 | 2/2022 | Park et al. |

FOREIGN PATENT DOCUMENTS

| | | |
|---|---|---|
| KR | 101528312 B1 | 6/2015 |
| KR | 20160057506 A | 5/2016 |
| KR | 101667736 B1 | 10/2016 |
| KR | 20170029329 A | 3/2017 |
| KR | 20170066415 A | 6/2017 |
| KR | 101786049 B1 | 10/2017 |
| KR | 101909030 B1 | 10/2018 |
| KR | 20190041815 A | 4/2019 |
| KR | 20190101693 A | 9/2019 |

OTHER PUBLICATIONS

International Search Report for PCT/KR2022/007211 mailed Aug. 25, 2022, 2 pages.

Written Opinion of the ISA for PCT/KR2022/007211 mailed Aug. 25, 2022, 4 pages.

Office Action dated Sep. 22, 2025 in Korean Patent Application No. 10-2021-0064962 and English-language translation.

Communication pursuant to Article 94(3) EPC dated Oct. 30, 2025 in European Patent Application No. 22805026.6.

ELECTRONIC DEVICE AND OPERATION METHOD OF ELECTRONIC DEVICE

CROSS-REFERENCE TO RELATED APPLICATIONS

This application is a continuation of International Application No. PCT/KR2022/007211 designating the United States, filed on May 20, 2022, in the Korean Intellectual Property Receiving Office and claiming priority to Korean Patent Application No. 10-2021-0064962, filed on May 20, 2021, in the Korean Intellectual Property Office, the disclosures of each of which are incorporated by reference herein in their entireties.

BACKGROUND

Field

The disclosure relates to an electronic device and a method for operating the electronic device.

Description of Related Art

Electronic devices may provide content through a display. Furthermore, electronic devices may generate content by recording a sound or video using a microphone and a camera.

Electronic devices may switch a screen and provide a content editing function in response to the reception of a user's request for editing content while providing the content according to a user's request.

SUMMARY

Embodiments of the disclosure may provide a method and device for editing content displayed on a timeline without switching a screen.

Embodiments of the disclosure may provide a method and device for easily editing content included in a running application.

An electronic device according to an example embodiment of the present disclosure may include: a camera, a display, at least one processor, and a memory, wherein the memory may store instructions that, when executed by one or more of the at least one processor, cause the electronic device to: display a timeline of first content in a first region displayed through the display, display, in a second region displayed through the display, a preview screen of the first content on the timeline corresponding to a first indicator indicating a position on the timeline displayed in the first region, display, in the second region, second content received through the camera while maintaining the displaying of the first region based on an input, and record the second content displayed in the second region starting from a portion corresponding to the first indicator based on an input to a first icon displayed through the display.

A method performed by an electronic device according to an example embodiment of the present disclosure may include: displaying a timeline of first content in a first region displayed through a display included in the electronic device based on an input requesting execution of a first app of the electronic device; displaying, in a second region displayed through the display, a preview screen of the first content on the timeline displayed in the first region; displaying, in the second region, second content received through a camera included in or operatively coupled to the electronic device while maintaining the displaying of the first region based on an input; and recording the second content displayed in the second region starting from a portion corresponding to a first indicator based on a user input to a first icon displayed through the display.

According to various example embodiments of the present disclosure, a method and device for editing content displayed on a timeline without switching a screen may be provided.

According to various example embodiments of the present disclosure, a method and device for easily editing content included in a running application may be provided.

Besides, various effects may be provided that are directly or indirectly identified through the present disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements.

DETAILED DESCRIPTION

Figure 1:
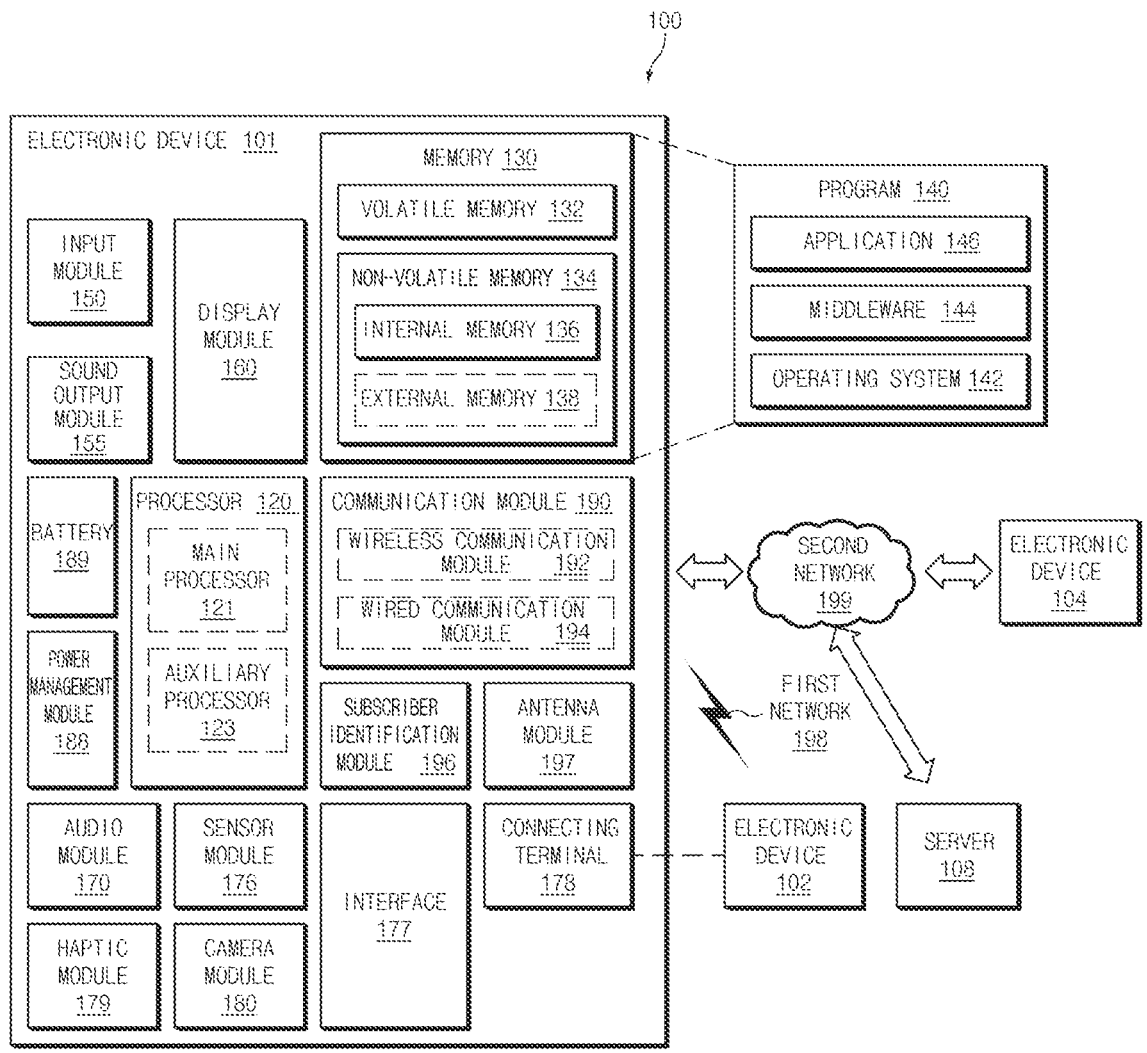
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry (as used herein, including the claims, the term "processor" may include various processing circuitry, including at least one processor, wherein one or more processors of at least one processor may be configured to perform the various functions described herein) and execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
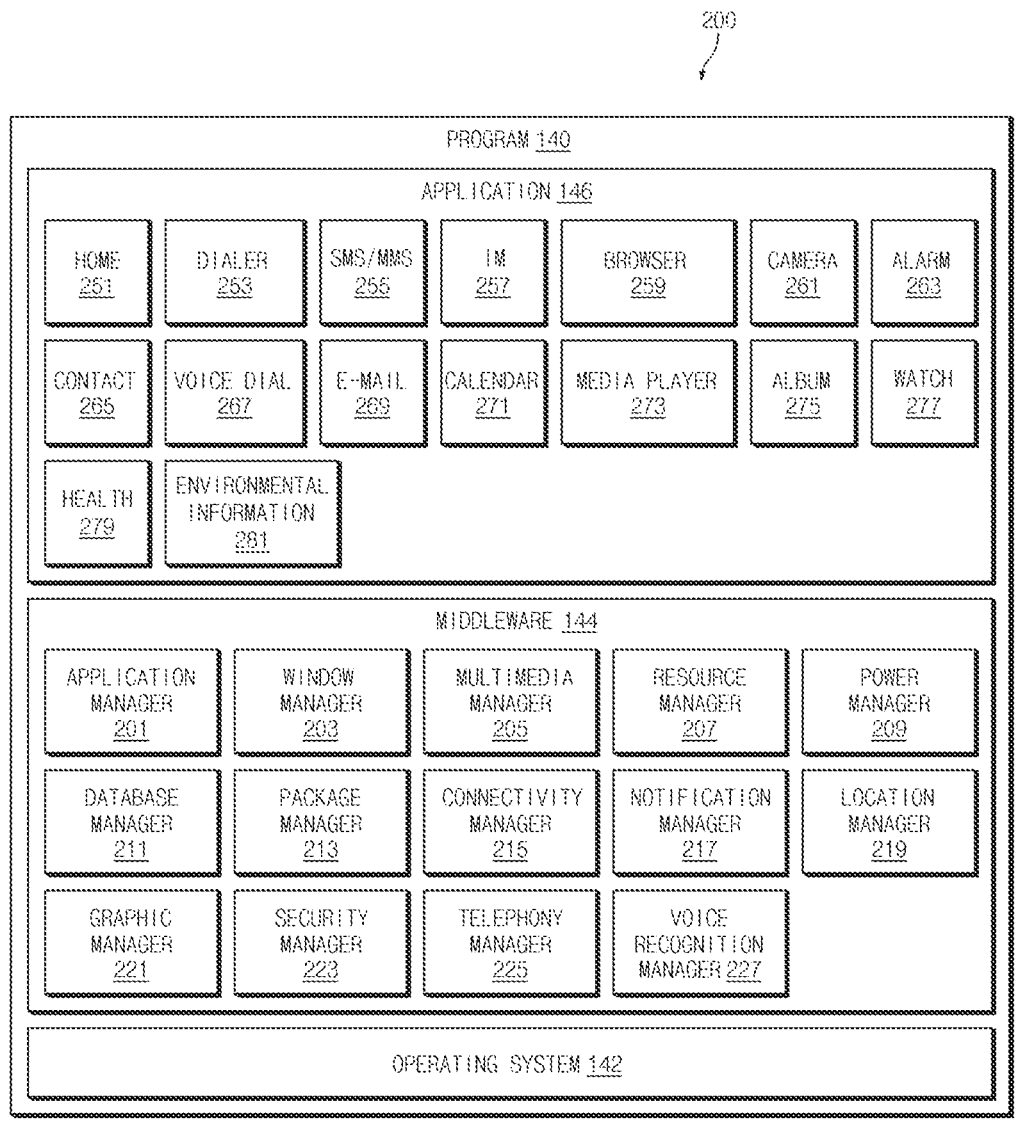
FIG. 2 is a block diagram illustrating an example configuration of a program according to various embodiments.

FIG. 2 is a block diagram 200 illustrating an example program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, and/or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
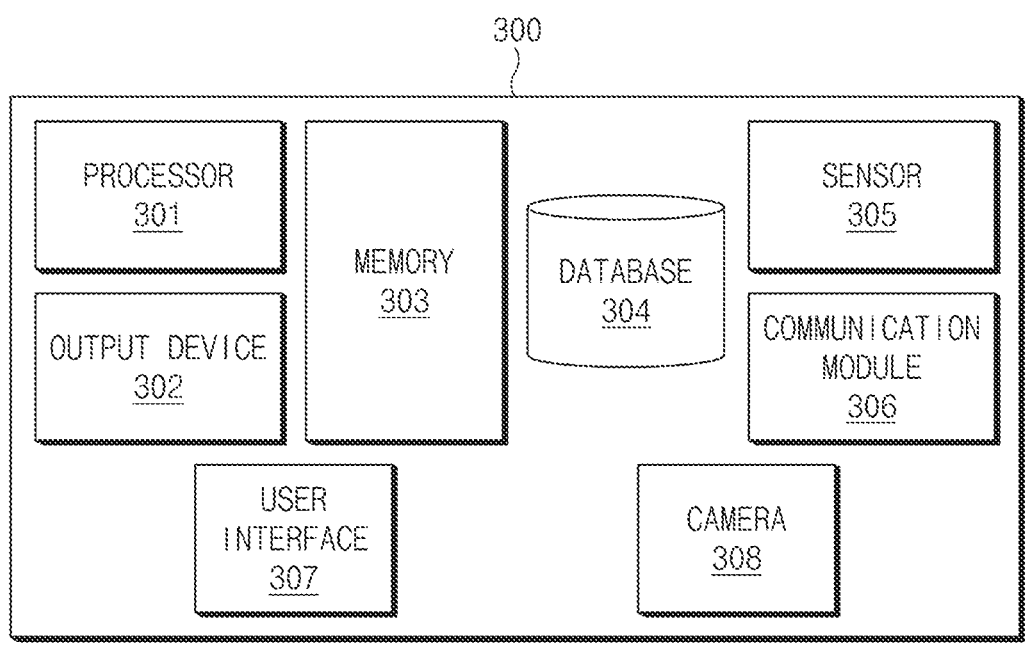
FIG. 3 is a block diagram illustrating an example configuration of an electronic device according to various embodiments.

FIG. 3 is a block diagram illustrating an example configuration of an electronic device 300 according to various embodiments. For clear explanation, descriptions overlapping with the above descriptions may be simplified or may not be repeated here.

Referring to FIG. 3, the electronic device 300 may include a processor (e.g., including processing circuitry) 301 (e.g., the at least one processor 120 of FIG. 1), an output device (e.g., including circuitry) 302, a memory 303 (e.g., the memory 130 of FIG. 1), a user interface (e.g., including interface circuitry) 307, a sensor 305, a camera 308, and a communication module (e.g., including communication circuitry) 306 (e.g., the communication module 190 of FIG. 1). The user interface 307 may include a microphone (not shown) (e.g., the input device 150 of FIG. 1) and a speaker (not shown) (e.g., the sound output device 155 of FIG. 1).

The electronic device 300 may further include at least one component in addition to the components illustrated in FIG. 3. According to an embodiment, the components of the electronic device 300 may be the same entity or include separate entities.

The electronic device 300 may include, for example, a smartphone, a tablet PC, a wearable device, a home appliance, a digital camera, or the like. According to an embodiment, the processor 301 may be operatively coupled to the communication module 306, the output device 302, the sensor 305, the camera 308, the memory 303, and the user interface 307 (microphone (not shown) and speaker (not shown) in order to perform an overall function of the electronic device 300.

The processor 301 may include, for example, at least one processor. The at least one processor may include, for example, an image signal processor (ISP), an application processor (AP), or a communication processor (CP). Furthermore, the processor 310 may drive a module by executing instructions stored in the memory 303. The processor 301 may include various processing circuitry (as used herein, including the claims, the term "processor" may include various processing circuitry, including at least one processor, wherein one or more processors of the at least one processor may be configured to perform the various functions described herein).

The processor 301 may be operatively coupled to a module in order to perform an overall function of the electronic device 300. In an embodiment of the present disclosure, an operation performed (or executed) by a module may be construed as an operation performed by the processor 301 by executing the instructions stored in the memory 303.

In an embodiment, the processor 301 may include a module. In this case, an operation performed (or executed) by each module may be implemented as at least a portion of the processor 301.

Various modules mentioned in various embodiments of the present disclosure may be implemented as hardware or software.

The electronic device 300 may include a database 304 including at least one piece of input data. The database 304 may be stored in the memory 303.

The memory 303 may include commands, information, or data associated with operation of components included in the electronic device 300. For example, the memory 303 may store instructions that, when executed, cause the processor 301 to perform various operations disclosed in the present disclosure.

In an embodiment, the electronic device 300 may receive an input, e.g., a user input, using the user interface 307. The user input may be an input for a user to execute an app. In an embodiment, the user interface 307 may be a microphone (or voice reception device), a display, or a graphic user interface (GUI). In an embodiment, the user input may be a voice input (e.g., speech) of the user. When the user input is a voice input, the electronic device 300 may receive the user input through a microphone (or voice reception device) (not shown). In an embodiment, the user input may be a touch input of the user. When the user input is a touch input, the electronic device 300 may receive the user input through the sensor 305. In an embodiment, the user input may be an input that expands the output device 302 (e.g., display) of the electronic device 300. For example, the electronic device 300 may receive a user input intended to expand a flexible display (e.g., a foldable display, rollable display) using the sensor 305.

In an embodiment, at least one of the operations of the components of the electronic device 300 described with reference to the electronic device 300 may be performed (or executed) in an external server (not shown) or another electronic device (not shown). For example, the processor 301 may use the communication module 306 to transmit a user input to an external server (not shown) or another electronic device (not shown).

The processor 301 may be configured with at least one processor, and may be physically divided into a main processor for performing a high-performance process and an auxiliary processor for performing a low-power process. Alternatively, a single processor may switch between high-performance processing and low-power processing according to a situation.

Hereinafter, operation of the at least one processor 301 will be described in greater detail.

According to an embodiment, the memory 303 may store instructions that, when executed, cause the processor 301 to control the electronic device to display a timeline of first content in a first region displayed through the display (e.g., the display module 160 of FIG. 1), display, in a second region displayed through the display, a preview screen of the first content on the timeline corresponding to a first indicator indicating a position on the timeline displayed in the first region, display, in the second region, second content received through the camera 308 while maintaining the displaying of the first region based on a user input, and record the second content displayed in the second region starting from a portion corresponding to the first indicator based on a user input to a first icon displayed through the display using the user interface.

According to an embodiment, the instructions may cause the processor 301 to receive, as the user input, a long-press input to the first indicator through the sensor 305 operatively coupled to the processor 301.

According to an embodiment, the instructions may cause the processor 301 to control the electronic device to display the first icon based on the user input to the first indicator.

According to an embodiment, the instructions may cause the processor 301 to control the electronic device to display a second icon in response to the user input to the first icon, and control a shooting mode based on a first user input to the second icon.

According to an embodiment, the shooting mode may include at least one of a video mode, a live focus mode, or a slow motion mode.

According to an embodiment, the instructions may cause the processor 301 to end the shooting mode in response to a second user input to the second icon.

According to an embodiment, the instructions may cause the processor 301 to control the electronic device to display an edit pop-up view in at least a partial region of a preview screen provided by an application running through the electronic device 300, and display at least one of the first region or the second region on the edit pop-up view.

According to an embodiment, the instructions may cause the processor 301 to receive a user input to at least one piece of content displayed on the preview screen provided by the application, activate an edit mode icon on the at least one piece of content in response to the user input, and display the edit pop-up view in at least a partial region of the application in response to a user input to the activated edit mode icon.

According to an embodiment, the instructions may cause the processor 301 to provide an edit mode for the first content based on the user input to the first indicator.

In an embodiment, the edit mode for the first content may include at least one mode among re-recording and length adjustment of the first content.

Hereinafter, a method performed by the electronic device 101 according to an embodiment of the present disclosure will be described in greater detail below with reference to FIGS. 4 and 5.

Figure 4:
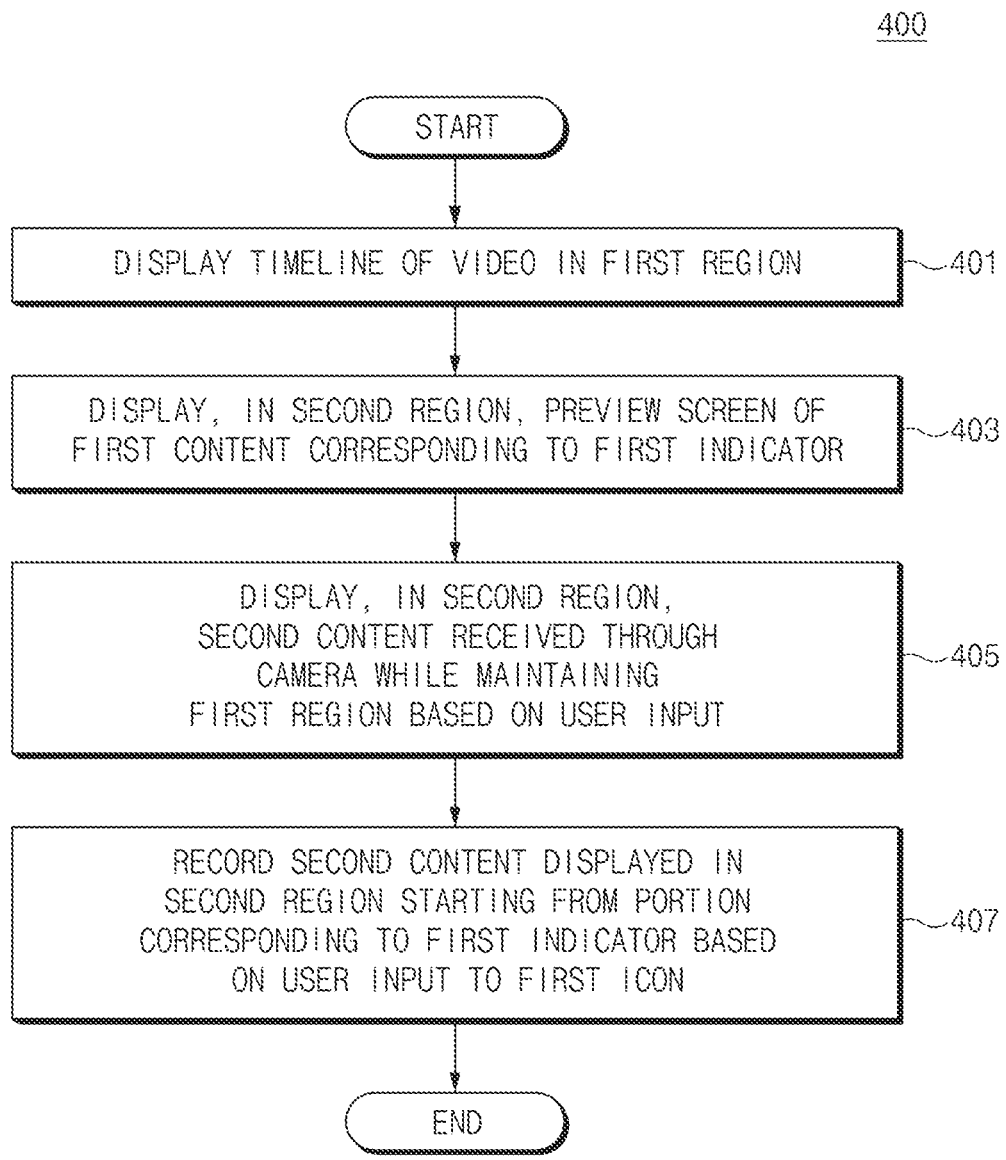
FIG. 4 is a flowchart illustrating an example method for an electronic device to record a new image in a video of a timeline without additional screen switching in a state in which the timeline is displayed according to various embodiments.

FIG. 4 is a flowchart 400 illustrating an example method for the electronic device 101 to record a new image in a video of a timeline without additional screen switching in a state in which the timeline is displayed according to various embodiments. According to an embodiment, the process illustrated in FIG. 4 may be construed as being performed by a processor (e.g., the processor 120 of FIG. 1) of an electronic device (e.g., the electronic device 101 of FIG. 1) by executing instructions stored in a memory (e.g., the memory 130 of FIG. 1). For clear explanation, descriptions overlapping with the above descriptions may be simplified or may not be repeated.

In operation 401, the electronic device 101 may display a timeline of a video in a first region. The first region may represent a region including at least a portion of a display included in or operatively coupled to the electronic device 101. The timeline may represent a space for editing software (e.g., image). For example, the electronic device 101 may display images for editing on the timeline for each sequence according to a running time of the images.

The electronic device 101 may further display a first indicator in the first region. The first indicator may represent a mark indicating a position on the displayed timeline. For example, the first indicator may represent a time bar. The electronic device 101 may display the first indicator so that at least a portion of the first region overlaps the first indicator.

In operation 403, the electronic device 101 may display, in a second region, a preview screen of first content corresponding to the first indicator. The second region may represent a region including at least a portion of a display included in or operatively coupled to the electronic device 101.

In operation 405, the electronic device 101 may display, in the second region, second content received through a camera included in, or operatively coupled to, the electronic device 101 while maintaining the first region based on a user input.

In an embodiment, the user input may be a touch input of the user. When the user input is a touch input, the electronic device 101 may receive the user input through a sensor (not shown).

In an embodiment, the user input may be a touch input to the first indicator. For example, the electronic device 101 may receive, as the user input, a long-press input to the first indicator through the sensor (not shown).

In an embodiment, the user input may be a voice input (e.g., speech) of the user. When the user input is a voice input, the electronic device 101 may receive the user input through a microphone (or voice reception device) (not shown).

In an embodiment, the user input may be an input that expands the display of the electronic device 101. For example, the electronic device 101 may receive a user input intended to expand a flexible display (e.g., a foldable display, rollable display) using the sensor (not shown).

In an embodiment, the electronic device 101 may display a first icon while maintaining the timeline in the first region in response to the user input.

In operation 407, the electronic device 101 may record a second image displayed in the second region starting from a portion corresponding to the first indicator based on a user input to the first icon.

For example, upon receiving the user input to the first icon 714, the electronic device 101 may perform shooting so as to insert the second image received using a camera included in or operatively coupled to the electronic device 101 starting from the portion corresponding to the first indicator.

Upon receiving the user input to the first icon, the electronic device 101 may display a second icon without displaying the first icon.

In an embodiment, the electronic device 101 may change a shooting mode through a swipe input to the second icon. For example, the electronic device 101 may change the shooting mode to a video mode, a live focus mode, or a slow motion mode through a left/right swipe input to the second icon.

The electronic device 101 may end the shooting mode through a user input that selects the second icon. For example, the electronic device 101 may end the shooting mode upon receiving a long-press input to the second icon.

According to an embodiment of the present disclosure, the electronic device 101 may effectively shoot and insert a new video.

Although FIG. 4 illustrates that the electronic device 101 sequentially performs operation 401 to operation 407, this is merely an example, and portion of the operations may be performed in the electronic device 101 and another portion may be performed in an external device.

Figure 5:
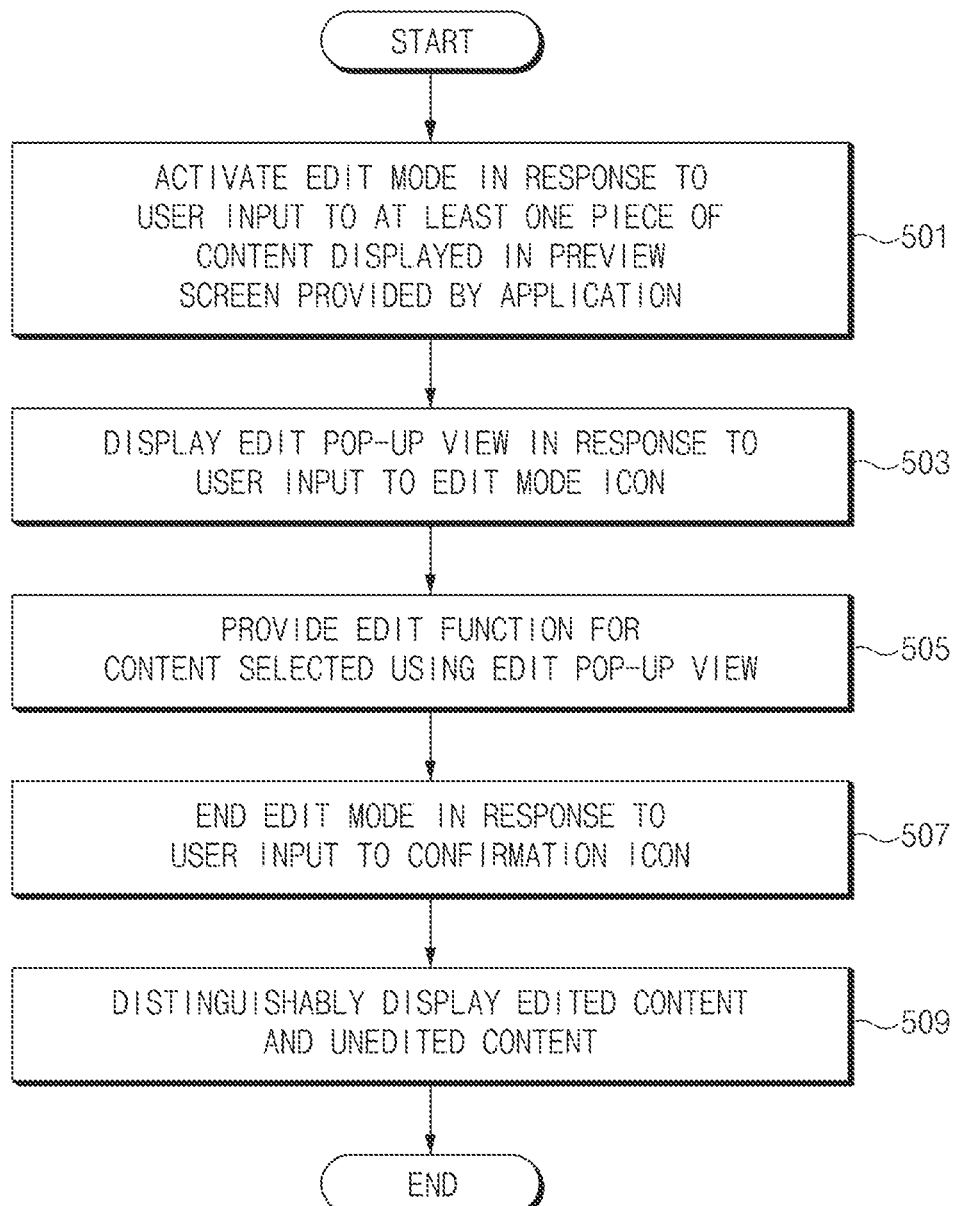
FIG. 5 is a flowchart illustrating an example method for an electronic device to record a new image in a video of a timeline without additional screen switching in a state in which the timeline is displayed according to various embodiments.

FIG. 5 is a flowchart 500 illustrating an example method for the electronic device 101 to record a new image in a video of a timeline without additional screen switching in a state in which the timeline is displayed according to various embodiments. According to an embodiment, the process illustrated in FIG. 5 may be construed as being performed by a processor (e.g., the processor 120 of FIG. 1) of an electronic device (e.g., the electronic device 101 of FIG. 1) by executing instructions stored in a memory (e.g., the memory 130 of FIG. 1). For clear explanation, descriptions overlapping with the above descriptions may be simplified or may not be repeated.

In operation 501, the electronic device 101 may activate an edit mode in response to a user input to at least one piece of content displayed on a preview screen provided by an application.

In an embodiment, the electronic device 101 may display an edit mode icon for the selected content in response to the received user input.

In operation 503, the electronic device 101 may display an edit pop-up view in at least a partial region of the application in response to a user input to the activated edit mode icon. The electronic device 101 may provide a function of image editing while maintaining the preview screen provided by the application, using the edit pop-up view.

In operation 505, the electronic device 101 may provide an edit function for the selected content using the edit pop-up view. For example, the electronic device 101 may provide an edit function of at least one of additional shooting, re-recording, or partial deletion for the selected content.

In operation 507, the electronic device 101 may end the edit mode in response to a user input to a confirmation icon.

In operation 509, the electronic device 101 may display edited content differentially from unedited content. For example, the electronic device 101 may further display a red dot above the edit mode icon displayed on the edited content.

The operations of FIG. 5 will be described in greater detail below with reference to FIGS. 11 to 20. According to an embodiment of the present disclosure, the electronic device 101 may edit selected content while maintaining an application being in use without switching a screen.

Although FIG. 5 illustrates that the electronic device 101 sequentially performs operation 501 to operation 509, this is merely an example, and portion of the operations may be performed in the electronic device 101 and another portion may be performed in an external device.

In an example embodiment, a method performed by the electronic device may include: displaying a timeline of first content in a first region displayed through a display included in the electronic device based on an input requesting execution of a first application of the electronic device based on a process being executed on a memory included in or operatively coupled to the electronic device; displaying, in a second region displayed through the display, a preview screen of the first content on the timeline displayed in the first region; displaying, in the second region, second content received through a camera included in or operatively coupled to the electronic device while maintaining the displaying of the first region based on an input; and recording the second content displayed in the second region starting from a portion corresponding to a first indicator based on an input to a first icon displayed through the display using the user interface.

In an example embodiment, the method performed by the electronic device may further include receiving, as the input, a long-press input to the first indicator through a sensor included in the electronic device.

In an example embodiment, the method performed by the electronic device may further include displaying a first icon based on an input to the first indicator.

In an example embodiment, the method performed by the electronic device may further include displaying a second icon in response to an input to the first icon and controlling a shooting mode based on a first input to the second icon.

In an example embodiment, the shooting mode may include at least one of a video mode, a live focus mode, or a slow motion mode in the method performed by the electronic device.

In an example embodiment, the method performed by the electronic device may further include ending the shooting mode in response to a second input to the second icon.

In an example embodiment, the method performed by the electronic device may further include displaying an edit pop-up view in at least a partial region of a preview screen provided by an application running through the electronic device, and displaying at least one of the first region or the second region on the edit pop-up view.

In an example embodiment, the method performed by the electronic device may further include receiving an input to at least one piece of content displayed on the preview screen provided by the application, activating an edit mode icon on the at least one piece of content in response to the input, and displaying an edit pop-up view in at least a partial region of the application in response to an input to the activated edit mode icon.

In an example embodiment, the method performed by the electronic device may further include providing an edit mode for the first content based on the input to the first indicator.

In an example embodiment, the edit mode for the first content may include at least one mode among re-recording and length adjustment of the first content in the method performed by the electronic device.

Hereinafter, the method performed by the electronic device 101 according to an embodiment will be described in greater detail with reference to the example drawings illustrated in FIGS. 6 to 21. In FIGS. 6 to 21, first content and second content are assumed to be video content to provide descriptions. This is an example, and the first content and the second content are not limited to video content.

Figure 6:
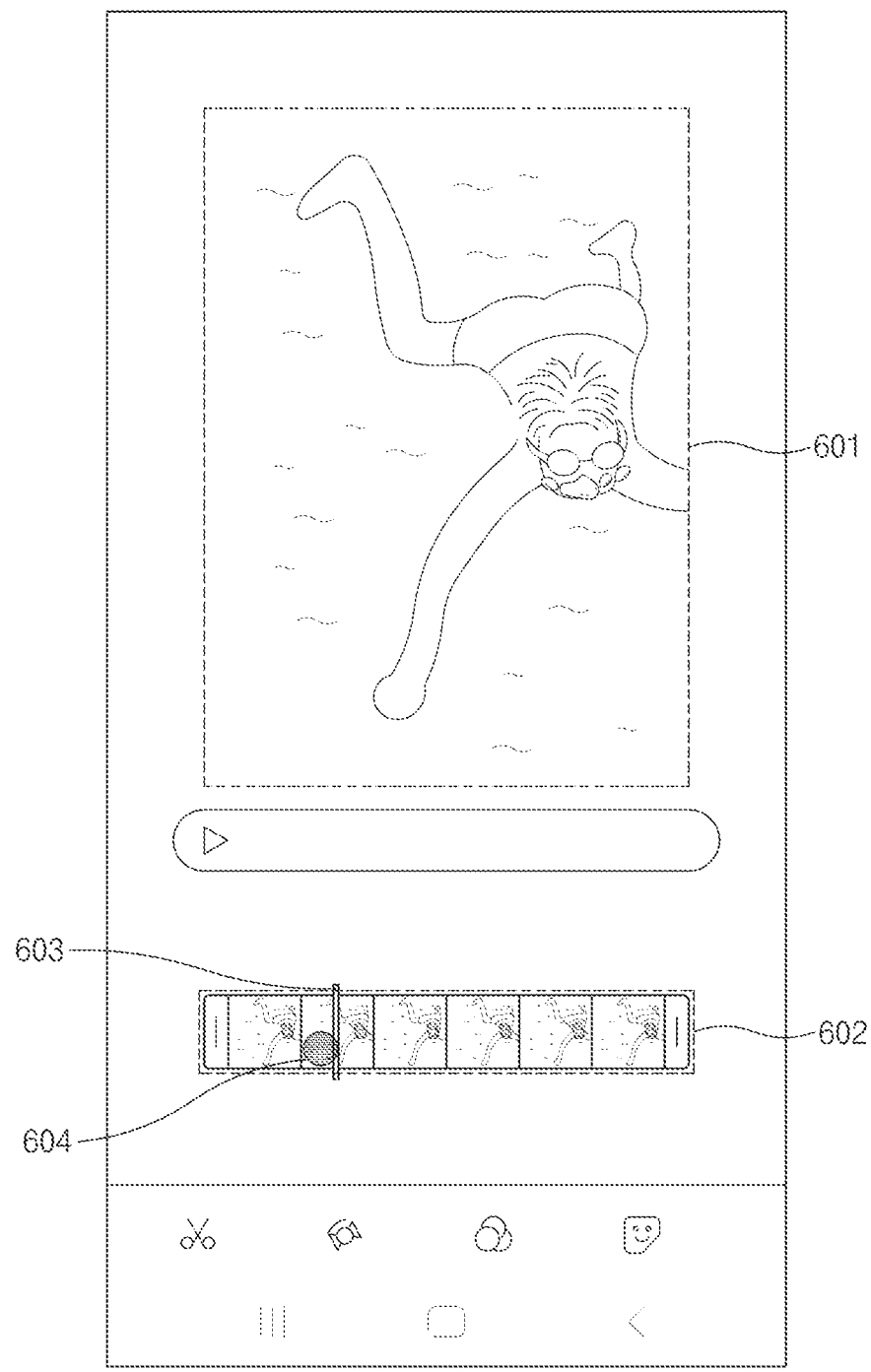
FIG. 6 is a diagram illustrating an example method for an electronic device to receive a user input according to various embodiments.

FIG. 6 is a diagram illustrating an example method for an electronic device to receive a user input according to various embodiments.

Referring to FIG. 6, the electronic device 101 is displaying a timeline in a first region 602 including at least a portion of a display. The timeline may represent a space for editing software (e.g., image). For example, the electronic device 101 may display images for editing on the timeline for each sequence according to a running time of the images.

The electronic device 101 may further display a first indicator 603 in the first region 602. The first indicator may represent a mark indicating a position on the displayed timeline. For example, the first indicator may represent a time bar.

The electronic device 101 may display a preview screen of a first image corresponding to the first indicator 603 on the timeline in a second region 601 including at least a portion of the display.

The electronic device 101 may receive a user input to the first indicator 603 using a user interface. In an embodiment, the user input may be a touch input of the user. When the user input is a touch input, the electronic device 101 may receive the user input through a sensor (not shown).

Referring to FIG. 6, the electronic device 101 may receive, as the user input, a long-press input 604 to the first indicator 603 through the sensor (not shown).

The electronic device 101 may provide a function of image editing while maintaining the first region 602 in response to the user input 604. Hereinafter, detailed descriptions will be provided with reference to FIGS. 7 to 10.

Figure 7:
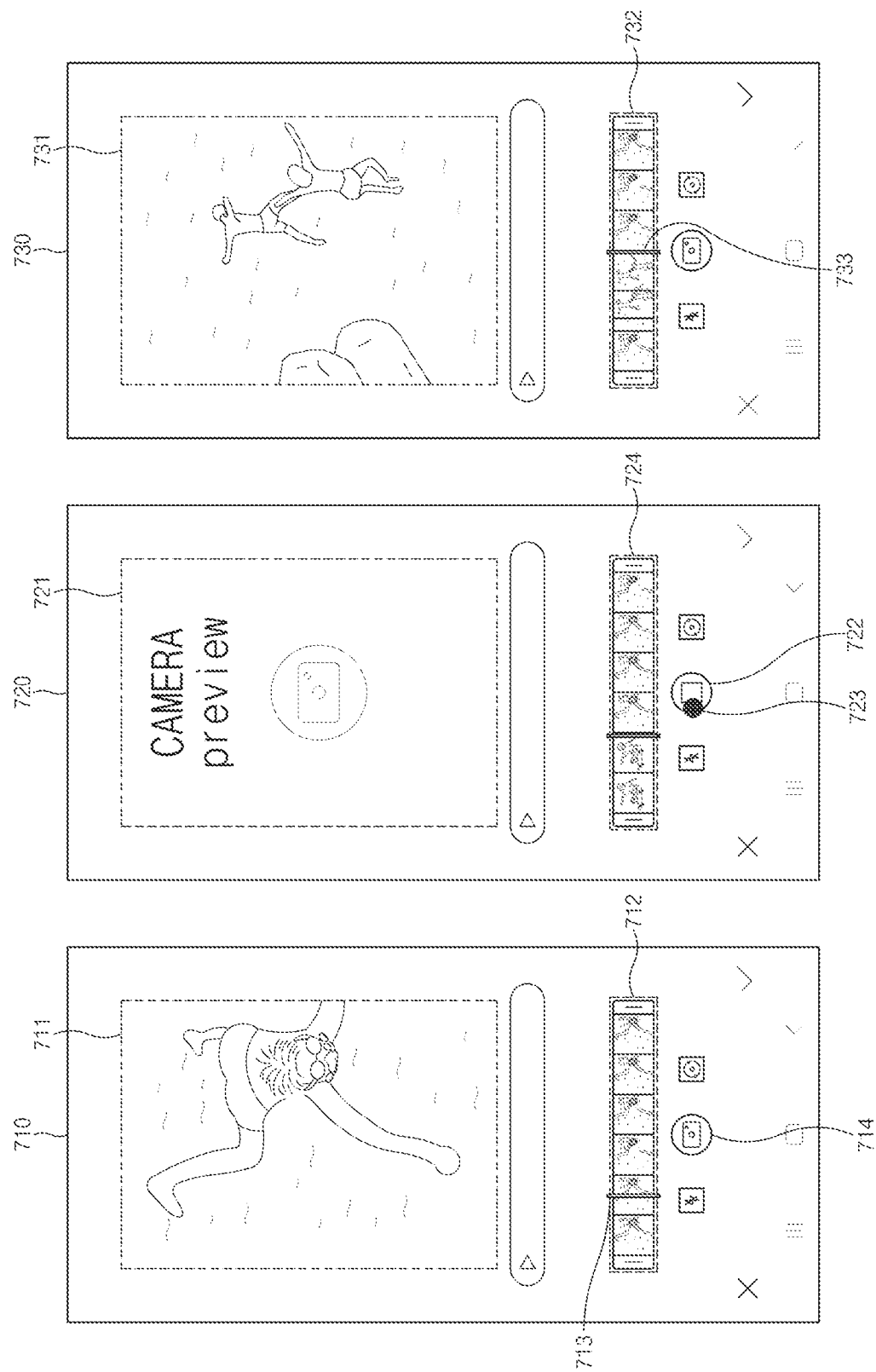
FIG. 7 is a diagram illustrating an example method for an electronic device to record a second image in response to a user input to a first indicator according to various embodiments.

FIG. 7 is a diagram illustrating an example method for the electronic device 101 to record a second image in response to a user input to a first indicator according to various embodiments.

As illustrated in FIG. 7, the electronic device 101 may display a first state 710 in at least a portion of a display included in or operatively coupled to the electronic device 101 in response to a long-press input (e.g., 604 of FIG. 6) to the first indicator (e.g., 603 of FIG. 6). In the first state 710, the electronic device 101 may display the first icon 714 while maintaining a timeline in a first region 712.

Upon receiving a user input to the first icon 714, the electronic device 101 may provide a shooting mode for inserting a second image received using a camera included in or operatively coupled to the electronic device 101 starting from a portion corresponding to the first indicator 713.

In a second state 720 electronic device 101 may display a preview 721 of the second image in the second region 711 of the first state.

The electronic device 101 may change a shooting mode through a swipe input to the second icon 722. For example, the electronic device 101 may change the shooting mode to a video mode, a live focus mode, or a slow motion mode through a left/right swipe input 723 to the second icon 722.

The electronic device 101 may end the shooting mode through a user input that selects the second icon 722. For example, the electronic device 101 may end the shooting mode upon receiving a long-press input to the second icon 722.

The electronic device 101 may display, on a timeline 732, images captured through the shooting mode in a third state 730. The electronic device 101 may display the second image in a second region 731 in response to an input that moves a first indicator 733 of the timeline 732.

According to an embodiment of the present disclosure, the electronic device 101 may effectively shoot and insert a new video.

Figure 8:
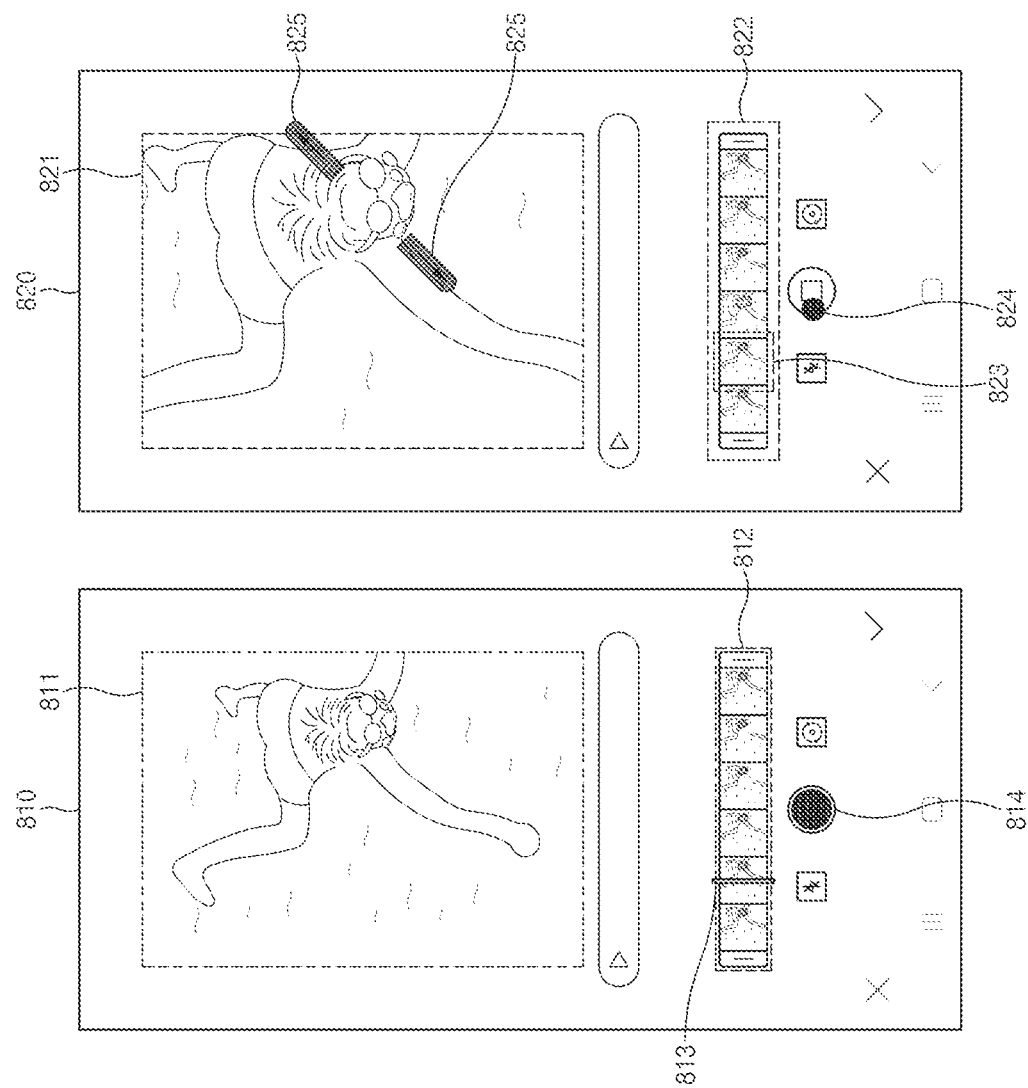
FIG. 8 is a diagram illustrating an example method for an electronic device to re-record by adjusting a screen of a first image in response to a user input to a first indicator according to various embodiments.

FIG. 8 is a diagram illustrating an example method for the electronic device 101 to re-record by adjusting a screen of a first image in response to a user input to a first indicator according to various embodiments.

Referring to FIG. 8, the electronic device 101 may display a first state 810 in at least a portion of a display included in or operatively coupled to the electronic device 101 in response to a long-press input (e.g., 604 of FIG. 6) to the first indicator (e.g., 603 of FIG. 6). In the first state 810, the electronic device 101 may display a second icon 814 while maintaining a timeline in a first region 812.

The electronic device 101 may display, in a second region, a first image 811 on a timeline 812 corresponding to a first indicator 813.

The electronic device 101 may re-record the first image 811 displayed in the second region in response to a user input to the second icon 814. In an embodiment, the electronic device 101 may edit the first image 811 according to a user input, such as enlargement, reduction, and/or rotation, to the first image 811 during the re-recording, and may reflect a result of the editing in real time so as to perform the re-recording.

Referring to a second state 820, for example, the electronic device 101 may enlarge the first image according to a user input 825 that enlarges the first image displayed in the second region.

The electronic device 101 may display, in the second region, a preview screen 821 that reflects the enlarged first image in real time. The electronic device 101 may also display 823 on a timeline 822 so as to indicate that the enlarged first image is being re-recorded. The electronic device 101 may distinguishably display, on the timeline 822, an image portion corresponding to a re-recorded portion.

For example, the electronic device 101 may display a distinguishable color at a portion under the timeline 822 corresponding to images that correspond to the re-recorded portion.

The electronic device may end the re-recording upon receiving a user input 824 to a third icon.

Figure 9:
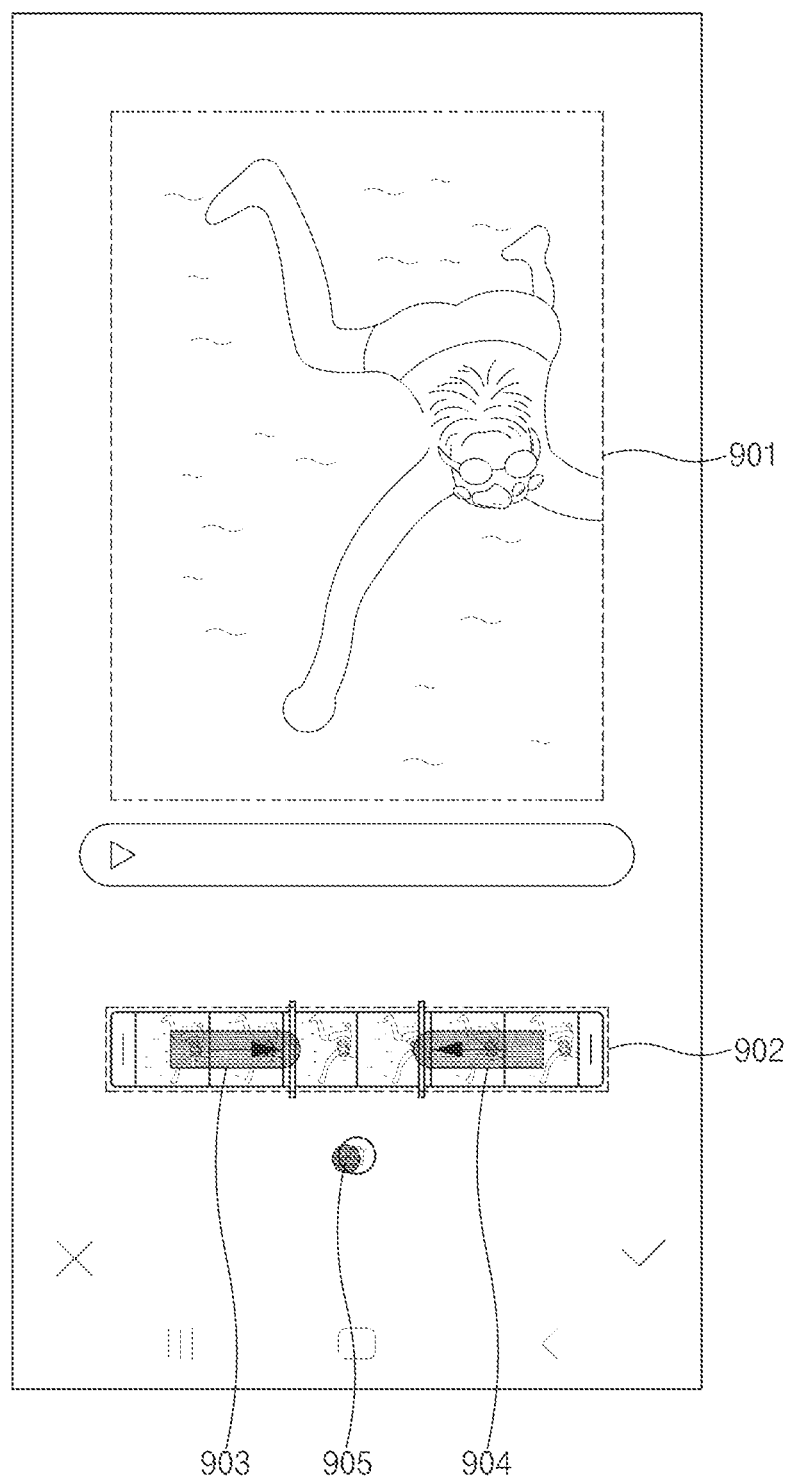
FIG. 9 is a diagram illustrating an example method for an electronic device to adjust a length of a first image in response to a user input to a first indicator according to various embodiments.

FIG. 9 is a diagram illustrating an example method for the electronic device 101 to adjust a length of a first image in response to a user input to a first indicator according to various embodiments.

Referring to FIG. 9, the electronic device 101 may activate a mode for adjusting a length of a first image in response to a long-press input (e.g., 604 of FIG. 6) to the first indicator (e.g., 603 of FIG. 6).

In an embodiment, the electronic device 101 may designate a region to be deleted in response to inputs 903 and 904 that adjust a position of a second indicator of a timeline 902. The electronic device 101 may distinguishably display the designated region to be deleted. For example, the electronic device 101 may blur a region on a timeline corresponding to the designated region to be deleted.

The electronic device 101 may delete a designated portion of the first image in response to the user's input 905 to a third icon, and may reflect a result of the deletion in real time so as to provide, in a second region, a preview 901 of the first image that has undergone the deletion.

Figure 10:
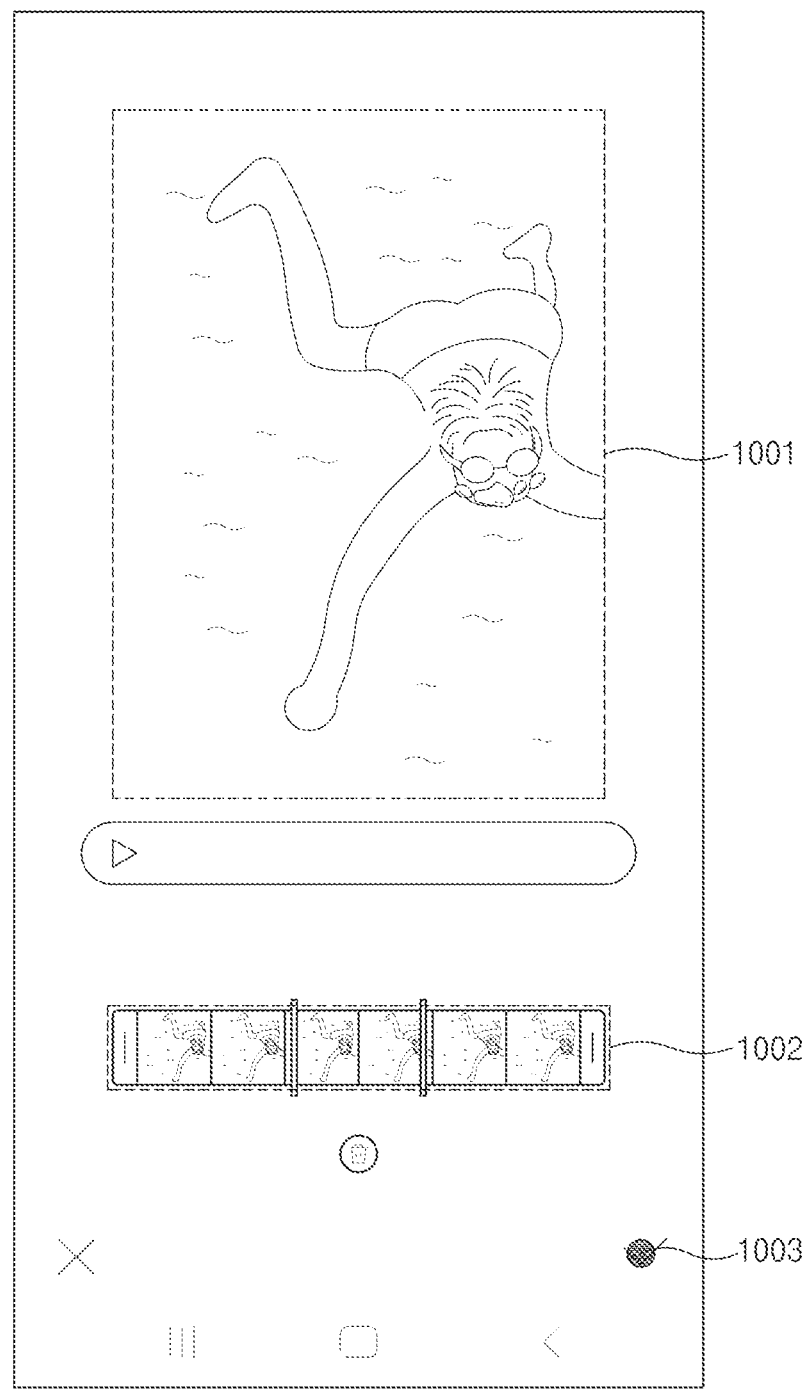
FIG. 10 is a diagram illustrating an example method for an electronic device to confirm an edited image according to various embodiments.

FIG. 10 is a diagram illustrating an example method for the electronic device 101 to confirm an edited image according to various embodiments.

Referring to FIG. 10, the electronic device 101 may reflect an edit result in a timeline of a first region 1002 in response to a long-press input (e.g., 604 of FIG. 6) to a first indicator (e.g., 603 of FIG. 6).

The electronic device 101 may display, in a second region 1001, an edited image of a portion at which a first indicator is located on the timeline of the first region 1002.

Upon receiving a user input to a confirmation icon 1003, the electronic device 101 may confirm an edit mode and end the edit mode. Upon receiving a user input to a cancel icon, the electronic device 101 may cancel an edit applied to the edited image.

Hereinafter, a method for the electronic device 101 to provide an edit mode while maintaining a screen provided by another application will be described in greater detail below with reference to FIGS. 11 to 21.

Figure 11:
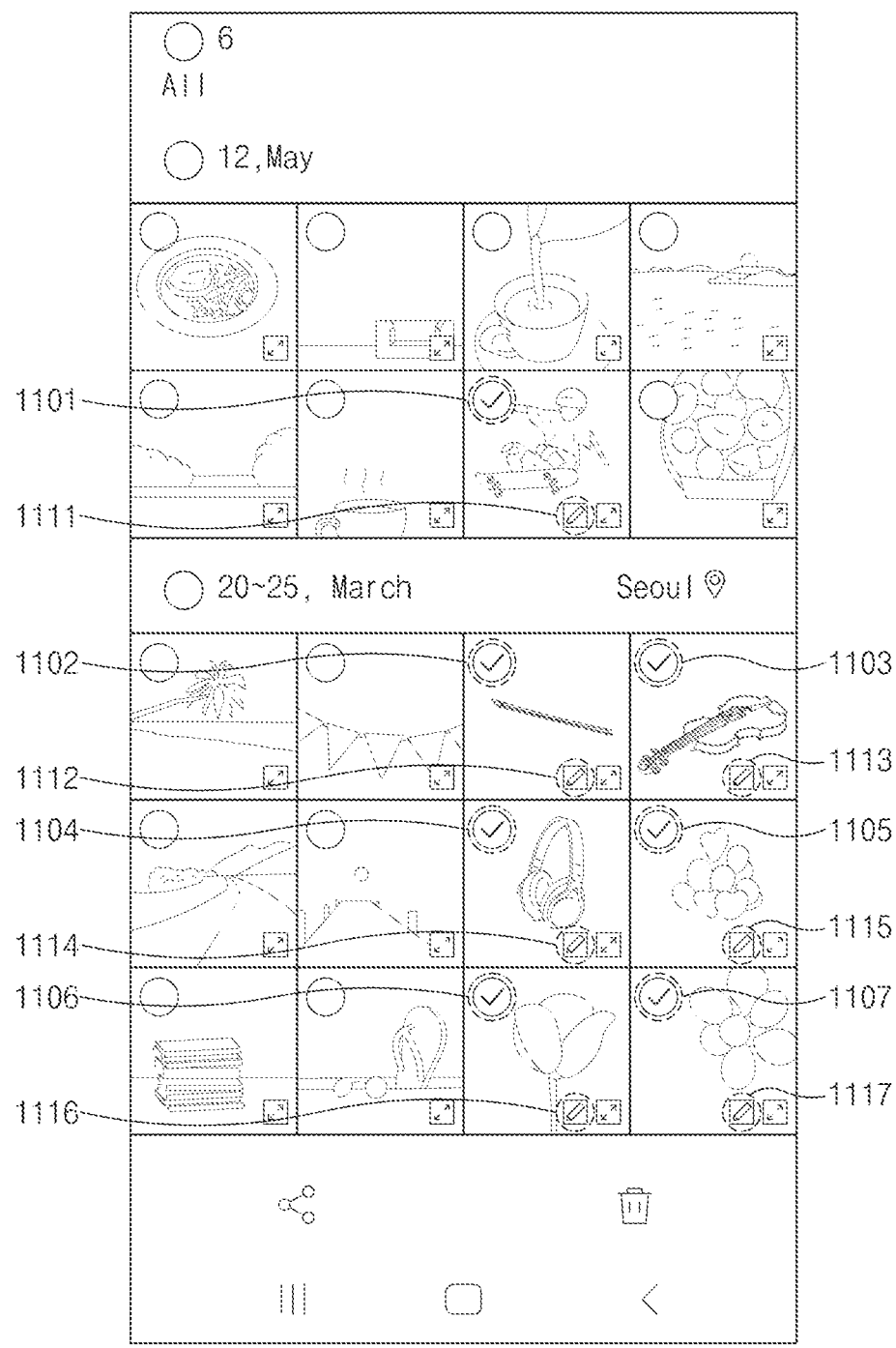
FIG. 11 is a diagram illustrating an electronic device displaying a preview screen provided by a gallery application according to various embodiments.

FIG. 11 is a diagram illustrating the electronic device 101 displaying a preview screen provided by a gallery application according to various embodiments. The electronic device 101 may receive inputs 1101, 1102, 1103, 1104, 1105, 1106, and 1107 that select at least one of pieces of displayed content.

In response to the received input, the electronic device 101 may activate, on the selected content, an edit mode icon for editing the content. For example, in response to the received input, the electronic device 101 may display edit mode icons 1111, 1112, 1113, 1114, 1115, 1116, and 1117 on the selected content.

The electronic device 101 may receive a user input to the displayed edit mode icons 1111, 1112, 1113, 1114, 1115, 1116, and 1117.

The electronic device 101 may receive the user input to the displayed edit mode icons 1111, 1112, 1113, 1114, 1115, 1116, and 1117 using a user interface. In an embodiment, the user input may be a touch input of the user. When the user input is a touch input, the electronic device 101 may receive the user input through a sensor (not shown).

For example, the electronic device 101 may receive, as the user input, a long-press input to the edit mode icons 1111, 1112, 1113, 1114, 1115, 1116, and 1117 through the sensor (not shown).

The electronic device 101 may display an edit pop-up view in response to the user input that is a long-press input to at least one among the edit mode icons 1111, 1112, 1113, 1114, 1115, 1116, and 1117.

The electronic device 101 may provide a function of image editing while maintaining the preview screen provided by the gallery application, using the edit pop-up view. Detailed descriptions will be provided below with reference to FIGS. 12 to 20.

Figure 12:
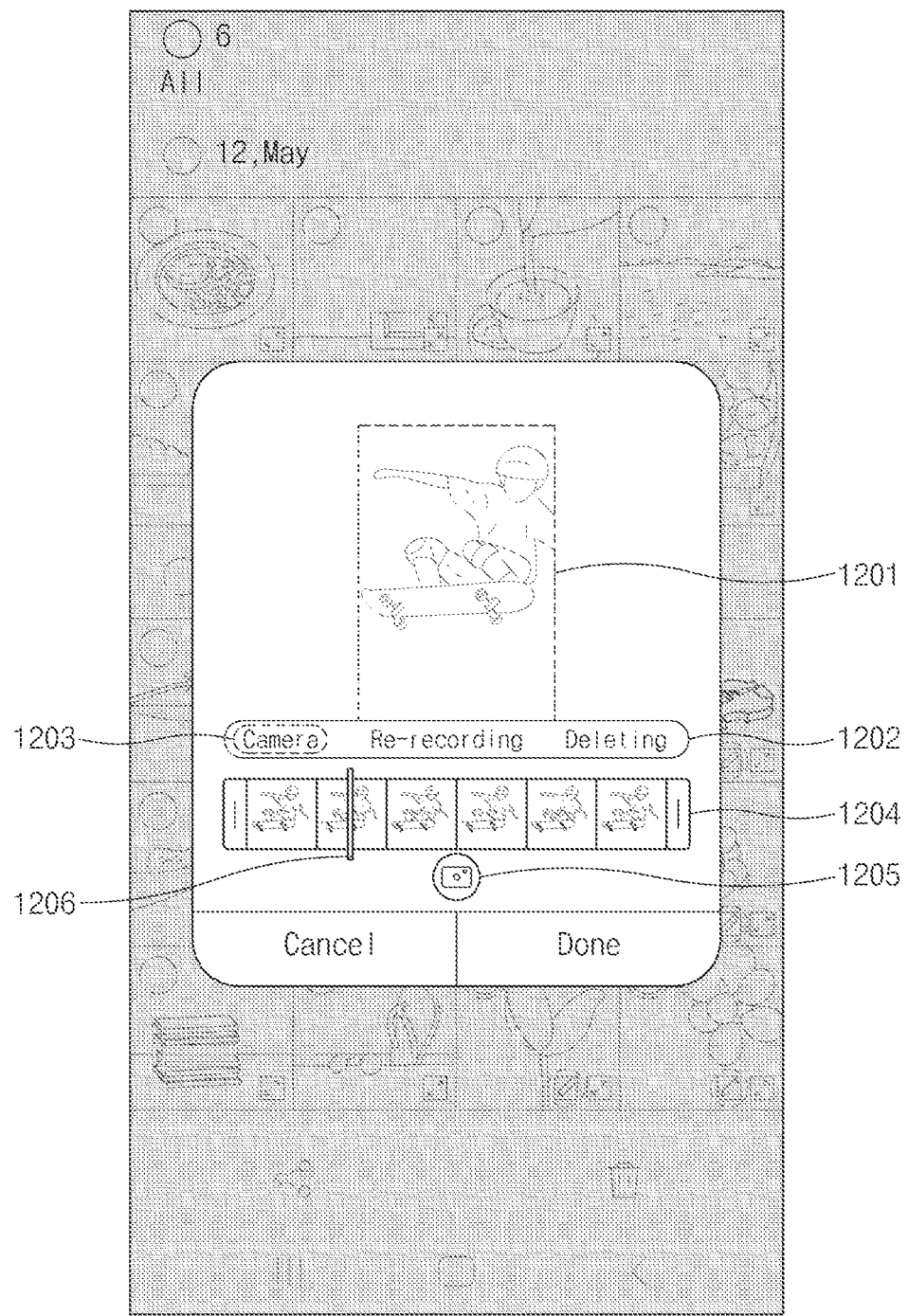
FIG. 12 is a diagram illustrating an example method for an electronic device to provide a function of image editing using an edit pop-up view while maintaining a preview screen provided by a gallery application according to various embodiments.

FIG. 12 is a diagram illustrating an example method for the electronic device 101 to provide a function of image editing using an edit pop-up view while maintaining a preview screen provided by a gallery application according to various embodiments.

Referring to FIG. 12, the electronic device 101 is displaying a timeline in a first region 1204 of an edit pop-up view. The timeline may represent a space for editing software (e.g., image). For example, the electronic device 101 may display images for editing on the timeline for each sequence according to a running time of the images.

The electronic device 101 may further display a first indicator 1206 in the first region 1204. The first indicator may represent a mark indicating a position on the displayed timeline. For example, the first indicator may represent a time bar.

The electronic device 101 may display a preview screen of a first image corresponding to the first indicator 1206 on the timeline in a second region 1201 of the edit pop-up view.

The electronic device 101 may receive a user input to the first indicator 1206 using a user interface. In an embodiment, the user input may be a touch input of the user. When the user input is a touch input, the electronic device 101 may receive the user input through a sensor (not shown).

Referring to FIG. 12, the electronic device 101 may receive, as the user input, a long-press input to the first indicator 1206 through the sensor (not shown).

The electronic device 101 may display, in a third region 1202, an icon for providing an image editing function while maintaining the first region 1204 in response to the user input (e.g., long-press input). In FIG. 12, Camera, Re-recording, and Deleting are displayed in the third region 1202 as examples of the icon for providing an image editing function.

The electronic device 101 may receive a user input to at least one of icons displayed in the third region 1202. As illustrated in FIG. 12, the electronic device 101 may receive a user input 1203 to the Camera icon.

As illustrated in FIG. 12, the electronic device 101 may display a first icon 1205 while maintaining a timeline in the first region 1204 in response to the user input 1203 to the Camera icon.

Upon receiving a user input to the first icon 1205, the electronic device 101 may provide a shooting mode for inserting a second image received using a camera included in or operatively coupled to the electronic device 101 starting from a portion corresponding to the first indicator 1206. Hereinafter, detailed descriptions will be provided below with reference to FIG. 13.

Figure 13:
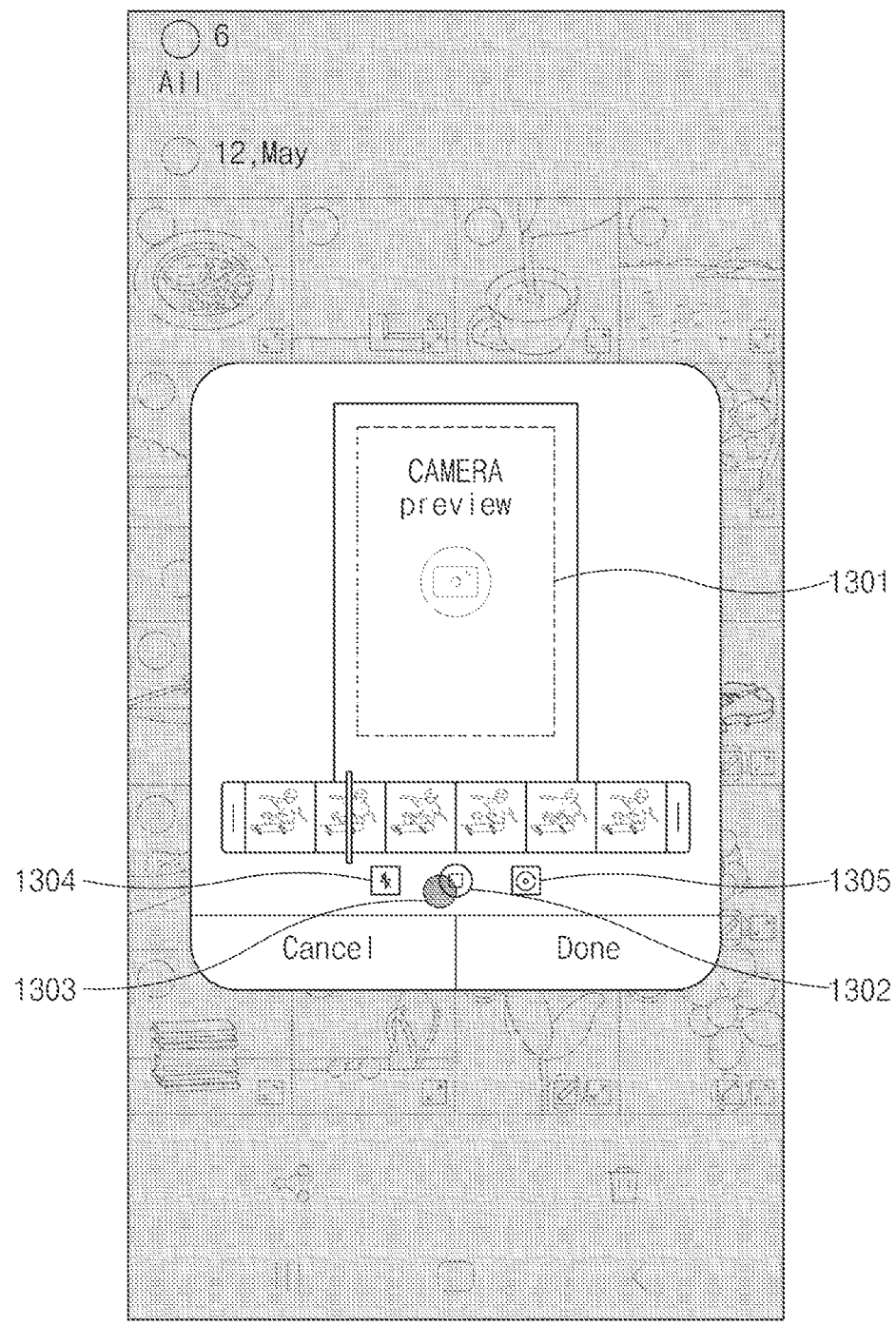
FIG. 13 is a diagram illustrating an example method for an electronic device to record a second image in response to a user input to a first icon according to various embodiments.

FIG. 13 is a diagram illustrating an example method for the electronic device 101 to record a second image in response to a user input to a first icon according to various embodiments.

The electronic device 101 may display a preview of the second image in a second region 1301 in response to a user input to the first icon (e.g., 1205 of FIG. 12).

The electronic device 101 may change a shooting mode through a swipe input 1303 to a second icon 1302. For example, the electronic device 101 may change the shooting mode to a live focus mode 1304 or a slow motion mode 1305 through a left/right swipe input 1303 to the second icon 1302.

The electronic device 101 may end the shooting mode through a user input that selects the second icon 1302. For example, the electronic device 101 may end the shooting mode upon receiving a long-press input to the second icon 1302.

Figure 14:
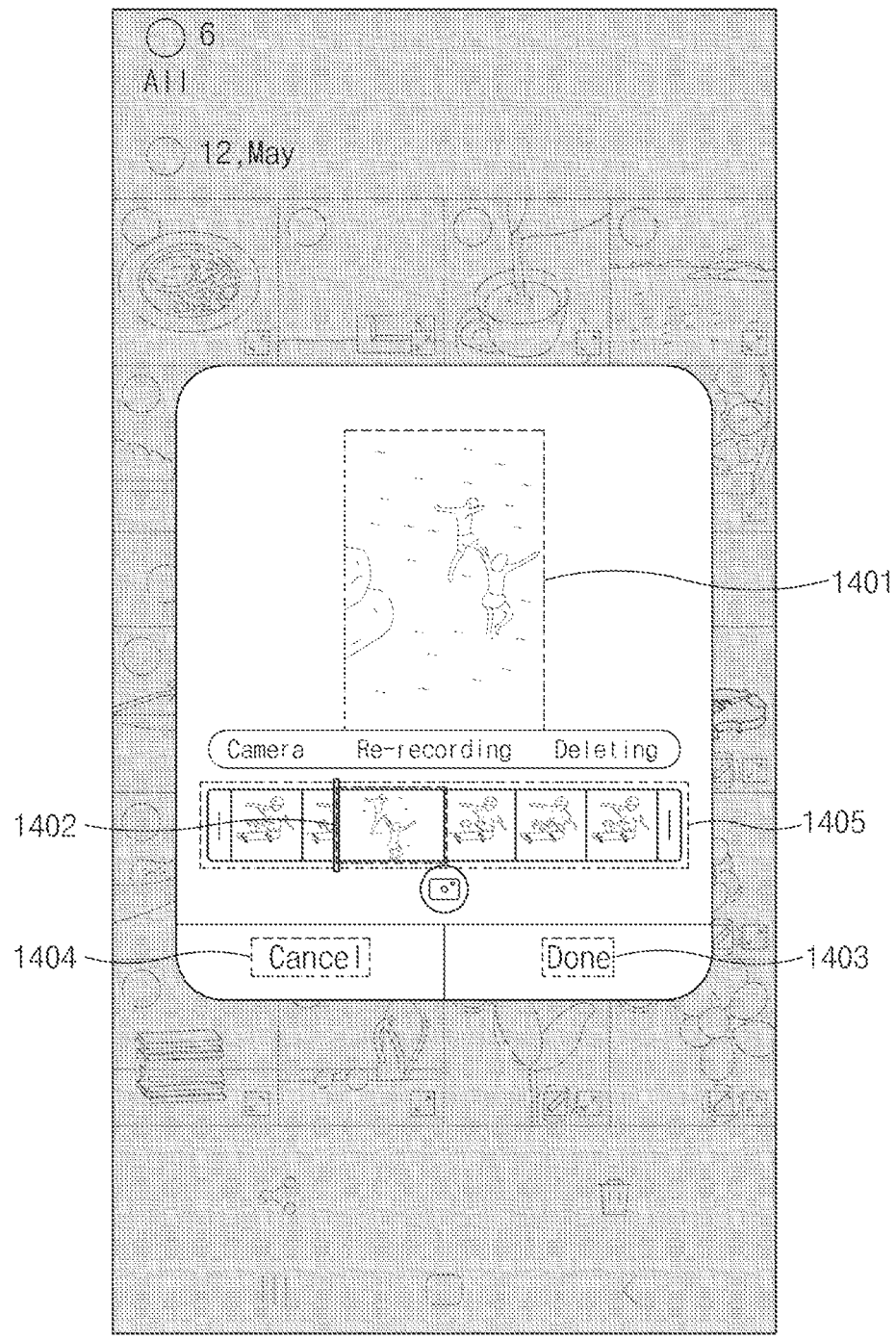
FIG. 14 is a diagram illustrating an example method for an electronic device to confirm an edited image according to various embodiments.

FIG. 14 is a diagram illustrating an example method for the electronic device 101 to confirm an edited image according to various embodiments.

The electronic device 101 may display, on a timeline 1405, images captured through the shooting mode. The electronic device 101 may display the second image in a second region 1401 in response to an input that moves a first indicator 1402 of the timeline 1405.

The electronic device 101 may display, in the second region 1401, an edited image of a portion at which the first indicator 1402 is located on the timeline 1405.

Upon receiving a user input to a confirmation icon, the electronic device 101 may confirm an edit mode and end the edit mode. Upon receiving a user input to a cancel icon, the electronic device 101 may cancel an edit applied to the edited image.

Referring to FIG. 14, the electronic device 101 may cancel all of the details edited through the edit mode upon receiving a user input to a cancel icon Cancel 1404. The electronic device 101 may confirm the details edited through the edit mode upon receiving a user input to a confirmation icon Done 1403.

According to an embodiment of the present disclosure, the electronic device 101 may shoot and insert a new video into a selected image while maintaining a preview screen of a gallery application without switching a screen.

Figure 15:
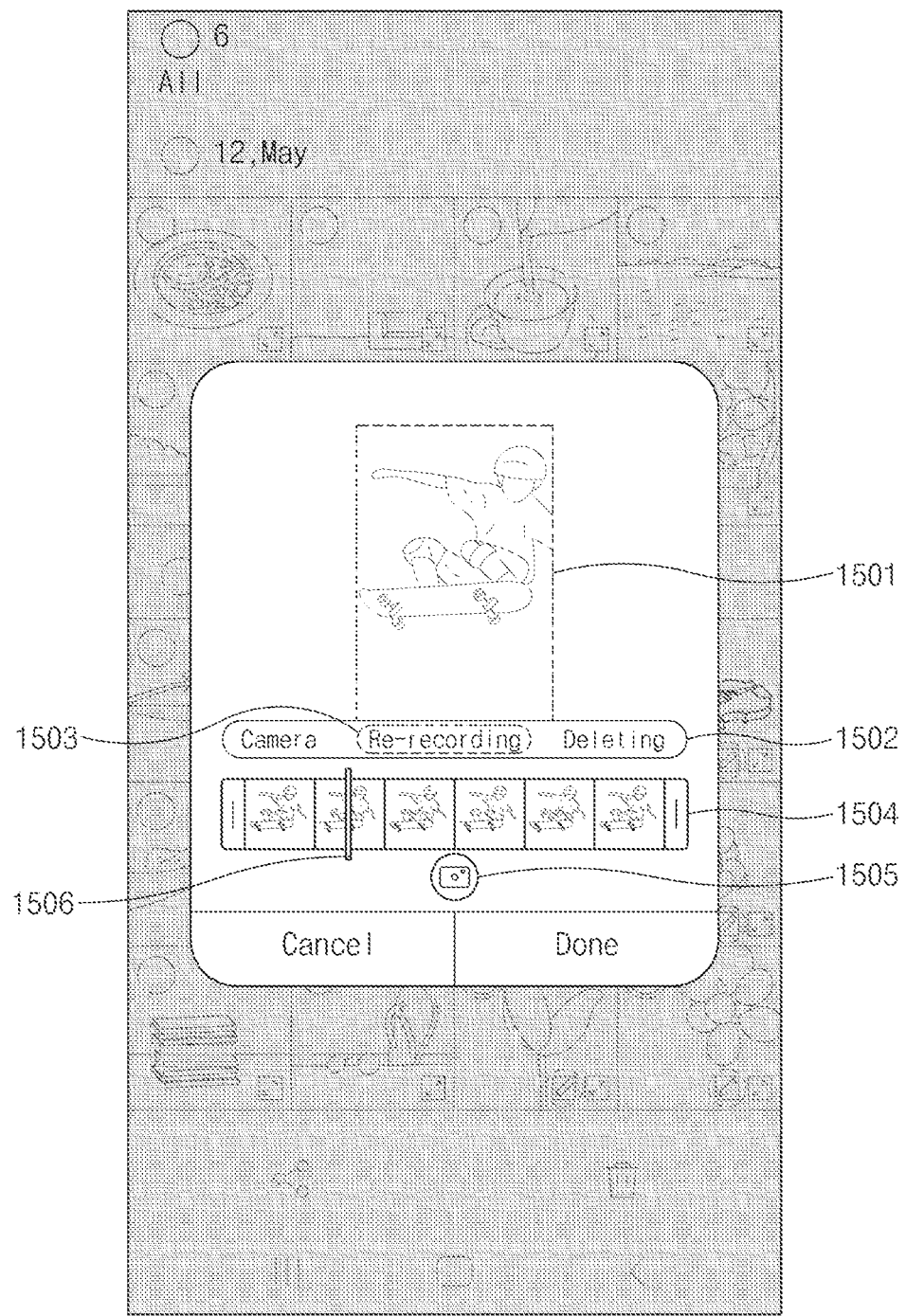
FIG. 15 is a diagram illustrating an example method for an electronic device to re-record by adjusting a screen of a first image using an edit pop-up view while maintaining a preview screen provided by an application according to various embodiments.
Figure 16:
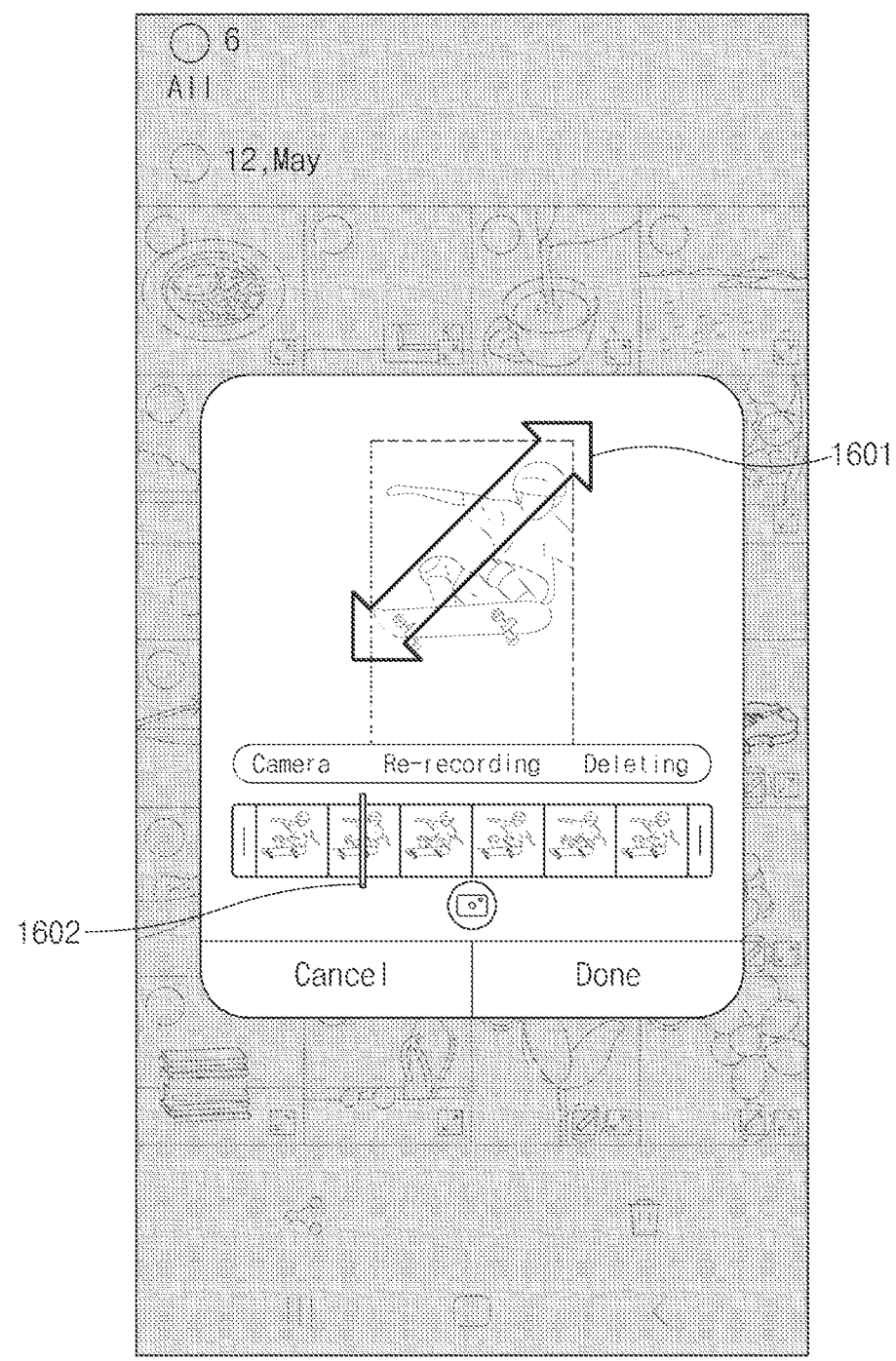
FIG. 16 is a diagram illustrating an example method for an electronic device to re-record a first image in response to a user input to a first icon according to various embodiments.
Figure 17:
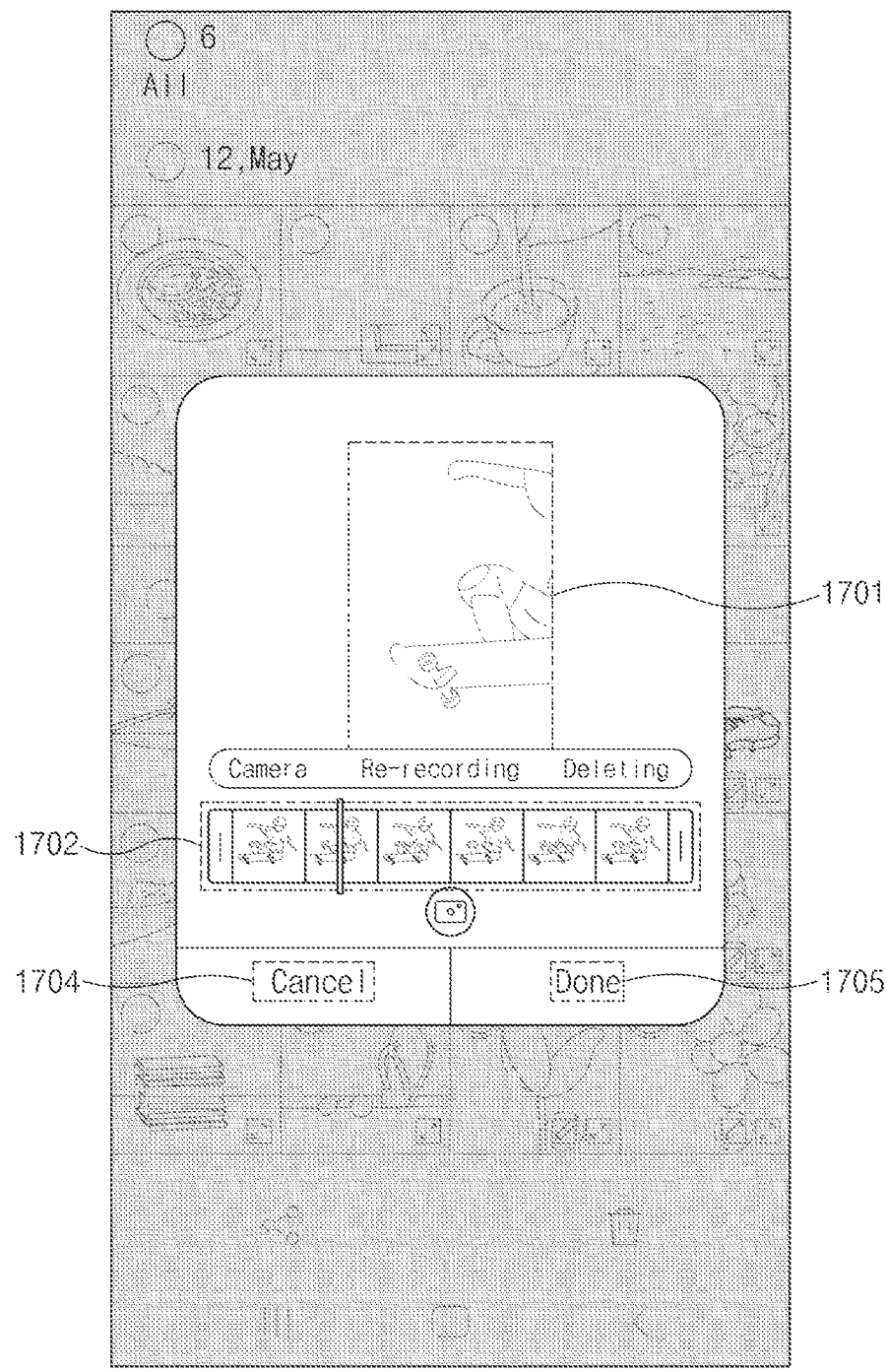
FIG. 17 is a diagram illustrating an example method for an electronic device to re-record by adjusting a screen of a first image using an edit pop-up view while maintaining a preview screen provided by an application according to various embodiments.

FIG. 15 to FIG. 17 are diagrams illustrating an example method for the electronic device 101 to re-record by adjusting a screen of a first image using an edit pop-up view while maintaining a preview screen provided by an application according to various embodiments.

Referring to FIG. 15, the electronic device 101 is displaying a timeline in a first region 1504 of an edit pop-up view. The timeline may represent a space for editing software (e.g., image). For example, the electronic device 101 may display images for editing on the timeline for each sequence according to a running time of the images.

The electronic device 101 may further display a first indicator 1506 in the first region 1504. The first indicator may represent a mark indicating a position on the displayed timeline. For example, the first indicator may represent a time bar.

The electronic device 101 may display a preview screen of a first image corresponding to the first indicator 1506 on the timeline in a second region 1501 of the edit pop-up view.

The electronic device 101 may receive a user input to the first indicator 1506 using a user interface. In an embodiment, the user input may be a touch input of the user. When the user input is a touch input, the electronic device 101 may receive the user input through a sensor (not shown).

Referring to FIG. 15, the electronic device 101 may receive, as the user input, a long-press input to the first indicator 1506 through the sensor (not shown).

The electronic device 101 may display, in a third region 1502, an icon for providing an image editing function while maintaining the first region 1504 in response to the user input (e.g., long-press input). In FIG. 15, Camera, Re-recording, and Deleting are displayed in the third region 1502 as examples of the icon for providing an image editing function.

The electronic device 101 may receive a user input to at least one of icons displayed in the third region 1502. As illustrated in FIG. 15, the electronic device 101 may receive a user input 1503 to a Re-recording icon.

As illustrated in FIG. 15, the electronic device 101 may display a first icon 1505 while maintaining a timeline in the first region 1504 in response to the user input 1503 to the Re-recording icon.

The electronic device 101 may re-record a first image displayed in the second region 1501 upon receiving a user input to the first icon 1505. Hereinafter, detailed descriptions will be provided with reference to FIG. 16.

FIG. 16 is a diagram illustrating an example method for the electronic device 101 to re-record a first image in response to a user input to a first icon according to various embodiments.

The electronic device 101 may display, in a second region, a first image on a timeline corresponding to a first indicator 1602.

In an embodiment, the electronic device 101 may edit the first image according to a user input, such as enlargement, reduction, and/or rotation, to the first image during the re-recording, and may reflect a result of the editing in real time so as to perform the re-recording.

Referring to FIG. 16, the electronic device 101 may receive a user input 1601 that enlarges the first image displayed in the second region. The electronic device 101 may display, in the second region, a preview screen that reflects the enlarged first image in real time. Hereinafter, more detailed descriptions will be provided below with reference to FIG. 17.

Referring to FIG. 17, the electronic device 101 may display, in the second region, a preview screen 1701 that reflects the enlarged first image in real time. The electronic device 101 may also display 1702 on a timeline so as to indicate that the enlarged first image is being re-recorded. The electronic device 101 may distinguishably display, on the timeline, an image portion corresponding to a re-recorded portion.

For example, the electronic device 101 may display a distinguishable color at a portion under the timeline corresponding to images that correspond to the re-recorded portion.

Upon receiving a user input to a confirmation icon, the electronic device 101 may confirm an edit mode and end the edit mode. Upon receiving a user input to a cancel icon, the electronic device 101 may cancel an edit applied to the edited image 1001.

Referring to FIG. 17, the electronic device 101 may cancel all of the details edited through the edit mode upon receiving a user input to a cancel icon Cancel 1704. The electronic device 101 may confirm the details edited through the edit mode upon receiving a user input to a confirmation icon Done 1705.

According to an embodiment of the present disclosure, the electronic device 101 may re-record an image corrected through editing such as enlargement, reduction, and/or rotation of a selected image while maintaining a preview screen of a gallery application without switching a screen.

Figure 18:
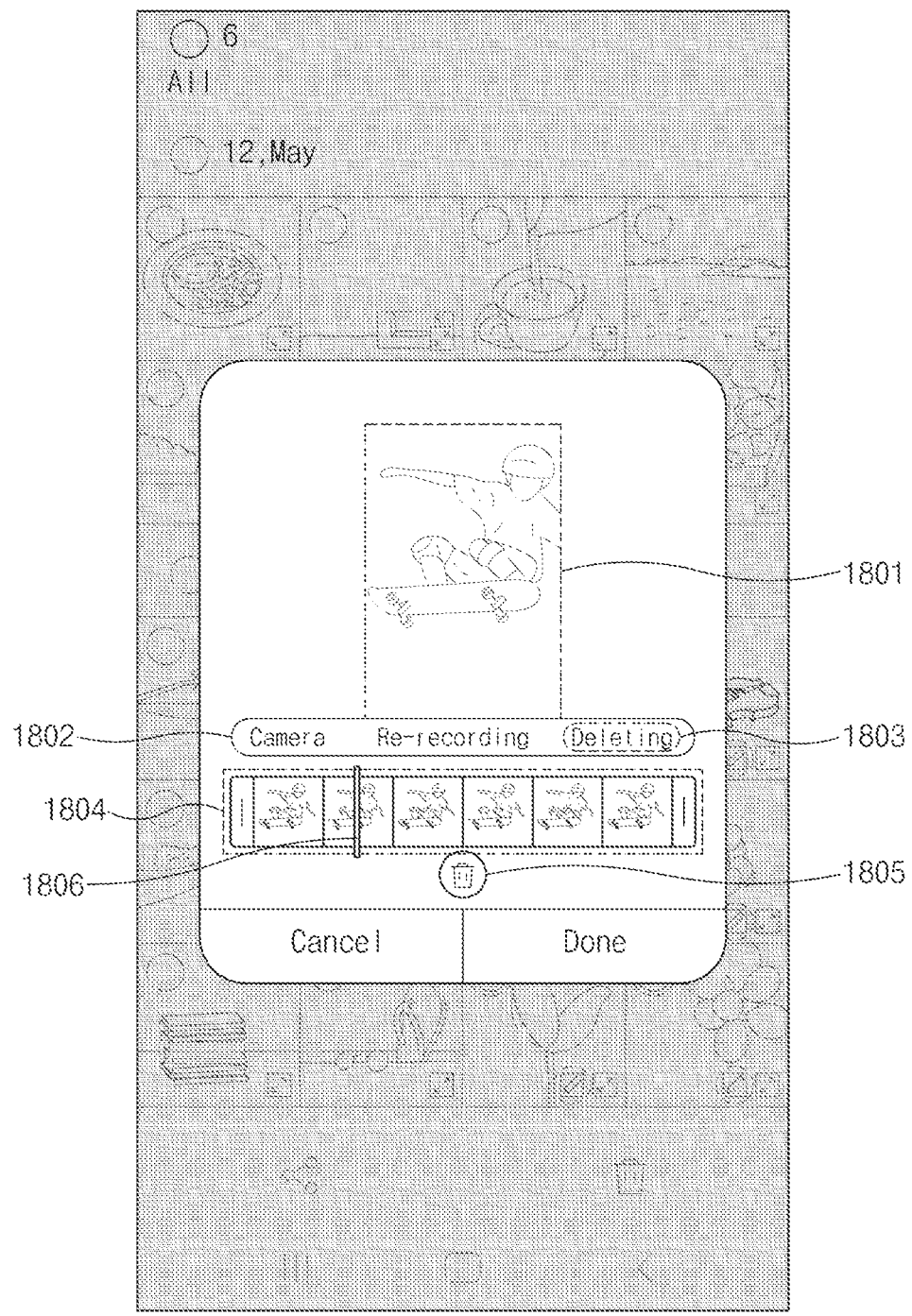
FIG. 18 is a diagram illustrating an example method for an electronic device to adjust a length of a first image using an edit pop-up view while maintaining a preview screen provided by an application according to various embodiments.
Figure 19:
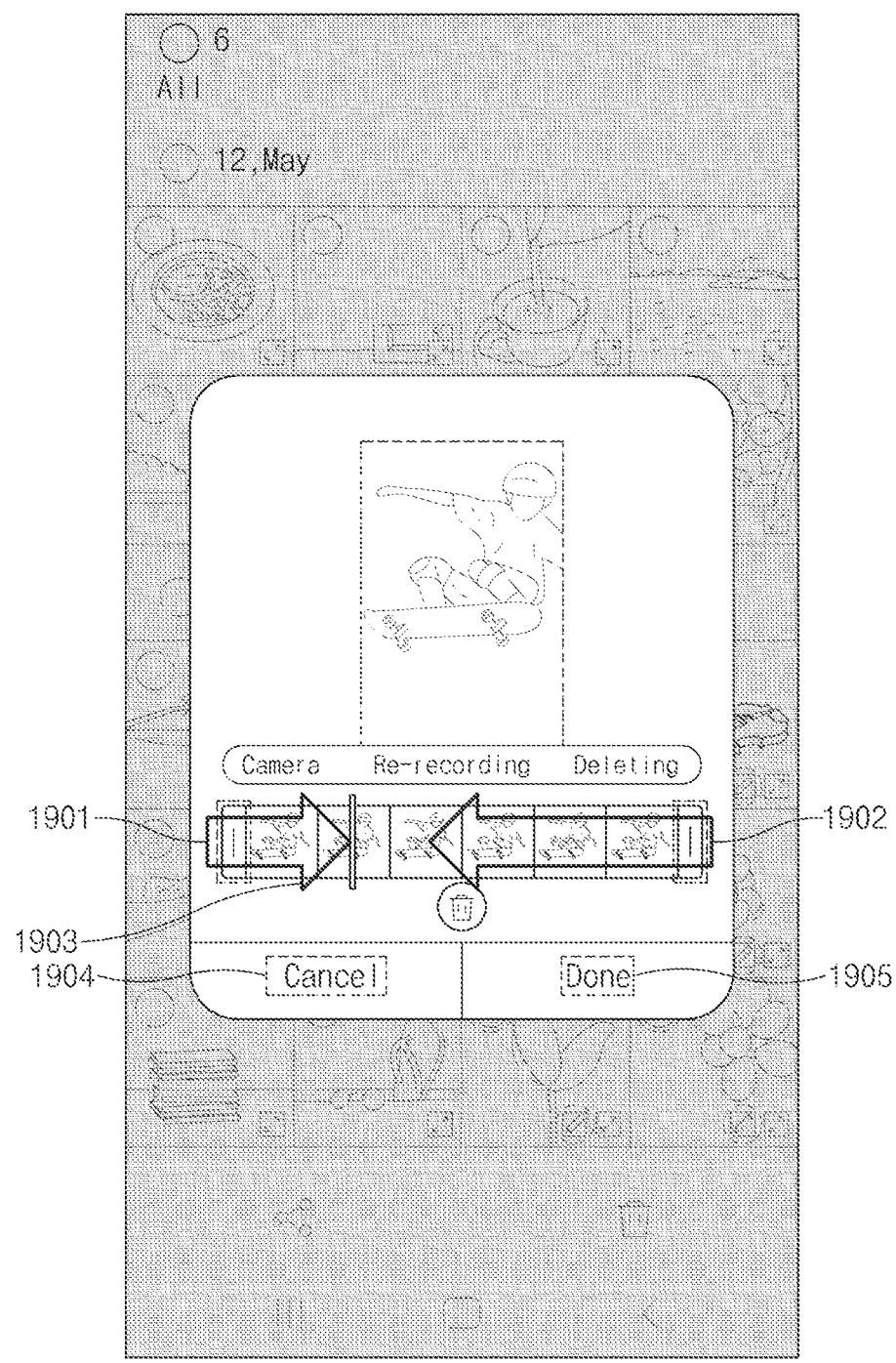
FIG. 19 is a diagram illustrating an example method for an electronic device to adjust a length of a first image using an edit pop-up view while maintaining a preview screen provided by an application according to various embodiments.
Figure 20:
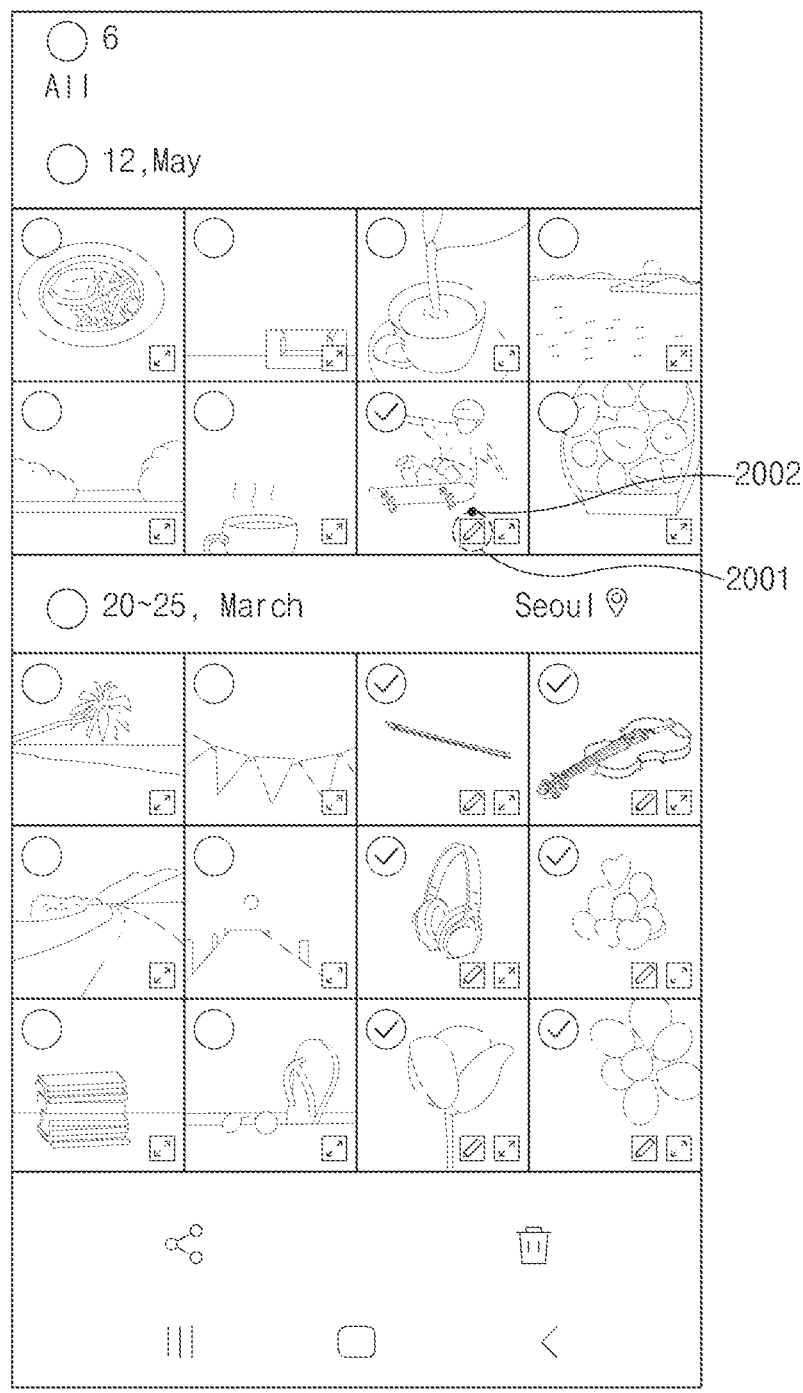
FIG. 20 is a diagram illustrating an example method for an electronic device to display an edited image according to an embodiment various embodiments.

FIG. 18 to FIG. 20 are diagrams illustrating an example method for the electronic device 101 to adjust a length of a first image using an edit pop-up view while maintaining a preview screen provided by an application according to various embodiments.

Referring to FIG. 18, the electronic device 101 is displaying a timeline in a first region 1804 of an edit pop-up view. The electronic device 101 may further display a first indicator 1806 in the first region 1804. The first indicator may represent a mark indicating a position on the displayed timeline. For example, the first indicator may represent a time bar.

The electronic device 101 may display a preview screen of a first image corresponding to the first indicator 1806 on the timeline in a second region 1801 of the edit pop-up view.

The electronic device 101 may receive a user input to the first indicator 1806 using a user interface. In an embodiment, the user input may be a touch input of the user. When the user input is a touch input, the electronic device 101 may receive the user input through a sensor (not shown).

Referring to FIG. 18, the electronic device 101 may receive, as the user input, a long-press input to the first indicator 1806 through the sensor (not shown).

The electronic device 101 may display, in a third region 1802, an icon for providing an image editing function while maintaining the first region 1804 in response to the user input (e.g., long-press input). In FIG. 18, Camera, Re-recording, and Deleting are displayed in the third region 1802 as examples of the icon for providing an image editing function.

The electronic device 101 may receive a user input to at least one of icons displayed in the third region 1802. As illustrated in FIG. 18, the electronic device 101 may receive a user input 1803 to the Deleting icon.

As illustrated in FIG. 18, the electronic device 101 may display a first icon 1805 while maintaining a timeline in the first region 1804 in response to the user input 1803 to the Deleting icon.

The electronic device 101 may delete at least a portion of a first image upon receiving a user input to the first icon 1805. Hereinafter, detailed descriptions will be provided with reference to FIG. 19.

Referring to FIG. 19, the electronic device 101 may designate a region to be deleted in response to inputs 1901 and 1902 that adjust a position of a second indicator of a timeline 902. The electronic device 101 may distinguishably display the designated region to be deleted. For example, the electronic device 101 may blur a region on a timeline corresponding to the designated region to be deleted.

The electronic device 101 may delete a designated portion of the first image in response to the user's input to a third icon 1903, and may reflect a result of the deletion in real time so as to provide, in a second region, a preview of the first image that has undergone the deletion.

Upon receiving a user input to a confirmation icon, the electronic device 101 may confirm an edit mode and end the edit mode. Upon receiving a user input to a cancel icon, the electronic device 101 may cancel an edit applied to the edited image.

Referring to FIG. 19, the electronic device 101 may cancel all of the details edited through the edit mode upon receiving a user input to a cancel icon Cancel 1904. The electronic device 101 may confirm the details edited through the edit mode upon receiving a user input to a confirmation icon Done 1905.

According to an embodiment of the present disclosure, the electronic device 101 may adjust the length of a selected image by partially deleting the selected image while maintaining a preview screen of a gallery application without switching a screen.

FIG. 20 is a diagram illustrating an example method for the electronic device 101 to display an edited image according to various embodiments.

Referring to FIG. 20, the electronic device 101 may display edited content differentially from unedited content. For example, the electronic device 101 may further display a red dot 2002 above an edit mode icon 2001 in at least a portion of a region in which edited content is shown.

Figure 21:
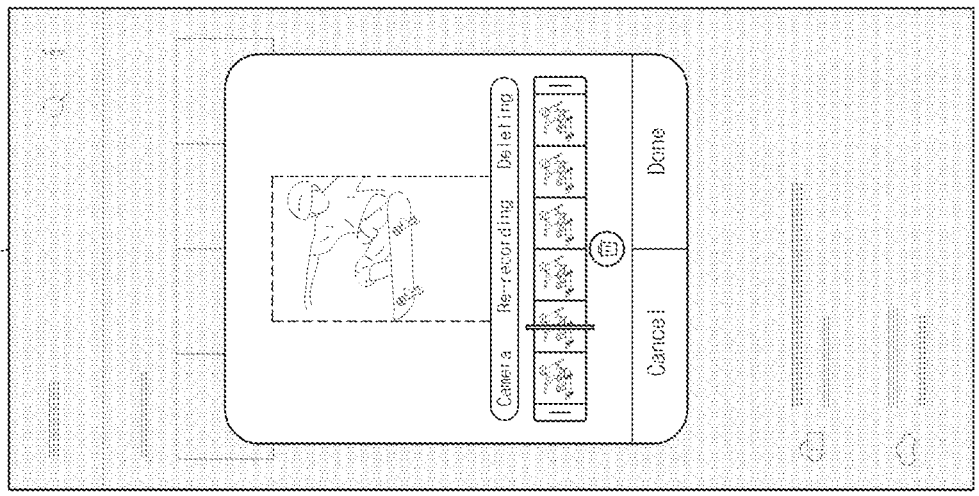
FIG. 21 is a diagram illustrating an electronic device displaying a screen that provides an edit mode while maintaining a screen provided by another application according to various embodiments.
Figure 21:
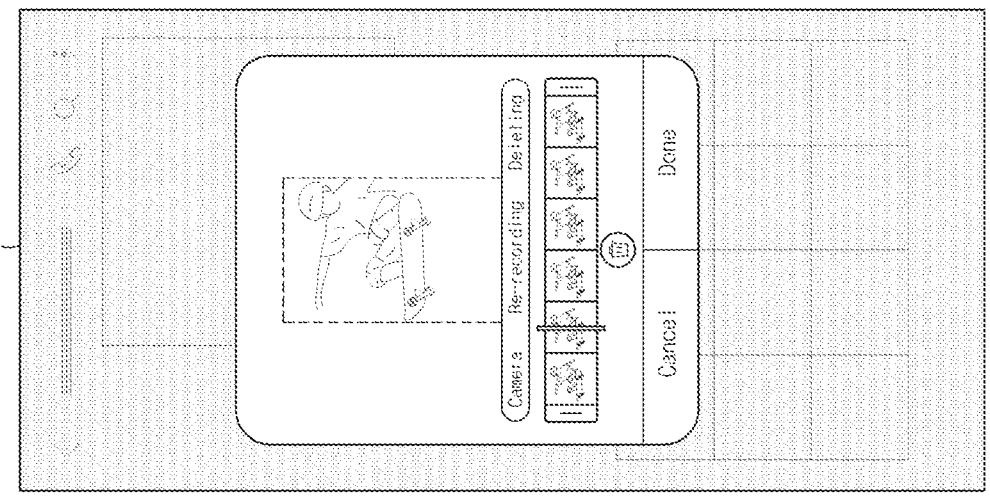
Figure 21:
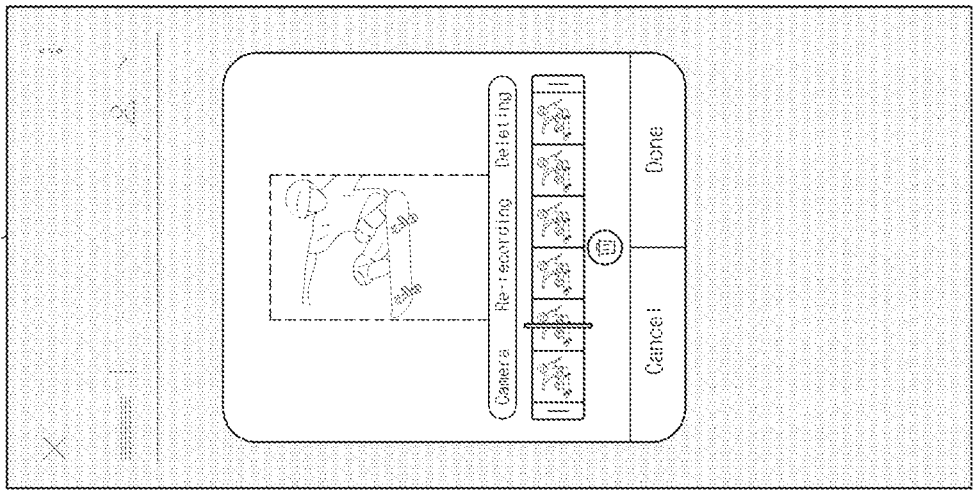

FIG. 21 is a diagram illustrating that the electronic device 101 displays screens 2100, 2110, and 2120 that provide an edit mode while maintaining a screen provided by another application according to various embodiments. Since relevant descriptions have been provided using FIGS. 11 to 20, detailed descriptions are not repeated here.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a camera;
    a display;
    at least one processor comprising processing circuitry; and
    memory operatively coupled to the at least one processor,
    wherein the memory stores instructions that, when executed by the at least one processor individually or collectively, cause the electronic device to:
        display a gallery preview screen of a gallery application, the gallery preview screen including plural images of contents,
        based on a first input selecting first content from the preview screen, provide a pop-up view for editing the first content while maintaining the preview screen in a background,
        display a timeline of the first content in a first region of the pop-up view,
        display, in a second region of the pop-up view, a preview screen of the first content corresponding to a first indicator indicating a position on the timeline displayed in the first region,
        based on a second input, display, in the second region, second content received through the camera while maintaining the displaying of the first region, and
        record the second content displayed in the second region starting from a portion corresponding to the first indicator based on a third input to a first icon displayed through the display.

2. The electronic device of claim 1, further comprising a sensor,
    wherein the memory stores instructions that, when executed by at least one processor individually or collectively, cause the electronic device to receive the second input by sensing a long-press input to the first indicator using the sensor.

3. The electronic device of claim 1, wherein the memory stores instructions that, when executed by at least one processor individually or collectively, cause the electronic device to display the first icon based on the second input.

4. The electronic device of claim 1, wherein the memory stores instructions that, when executed by at least one processor individually or collectively, cause the electronic device to:
    display a second icon in response to the third input to the first icon, and
    control a shooting mode based on a fourth input to the second icon.

5. The electronic device of claim 4, wherein the shooting mode includes at least one of a video mode, a live focus mode, or a slow motion mode.

6. The electronic device of claim 4, wherein the memory stores instructions that, when executed by at least one processor individually or collectively, cause the electronic device to end the shooting mode in response to a fifth input to the second icon.

7. The electronic device of claim 1, wherein the memory stores instructions that, when executed by at least one processor individually or collectively, cause the electronic device to provide an edit mode for the first content based on the second input to the first indicator.

8. The electronic device of claim 7, wherein the edit mode for the first content includes at least one mode among re-recording or length adjustment of the first content.

9. A method performed by an electronic device, the method comprising:
    displaying a gallery preview screen of a gallery application, the gallery preview screen including plural images of contents;

based on a first input selecting first content from the preview screen, provide a pop-up view for editing the first content while maintaining the preview screen in a background;

displaying a timeline of the first content in a first region of the pop-up view;

displaying, in a second region of the pop-up view, a preview screen of the first content corresponding to a first indicator indicating a position on the timeline;

based on a second input, displaying, in the second region, second content received through a camera included in or operatively coupled to the electronic device while maintaining the displaying of the first region; and recording the second content displayed in the second region starting from a portion corresponding to the first indicator based on a third input to a first icon displayed on the pop-up view.

10. The method of claim 9, further comprising receiving the second input by sensing a long-press input to the first indicator.

11. The method of claim 9, further comprising displaying the first icon based on the second input to the first indicator.

12. The method of claim 9, further comprising:
displaying a second icon in response to the second input to the first icon; and
controlling a shooting mode based on a fourth input to the second icon.

13. The method of claim 12, wherein the shooting mode includes at least one of a video mode, a live focus mode, or a slow motion mode.

14. The method of claim 12, further comprising:
ending the shooting mode in response to a fifth input to the second icon.

15. The method of claim 9, further comprising:
providing an edit mode for the first content based on the second input to the first indicator.

16. The method of claim 15, wherein the edit mode for the first content includes at least one mode among re-recording and length adjustment of the first content.

* * * * *